United States Patent
Qiu et al.

(10) Patent No.: US 10,664,461 B2
(45) Date of Patent: May 26, 2020

(54) LARGE CONTENT FILE OPTIMIZATION

(71) Applicant: Cohesity, Inc., Santa Clara, CA (US)

(72) Inventors: Zhihuan Qiu, Santa Clara, CA (US); Ganesha Shanmuganathan, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 19 days.

(21) Appl. No.: 16/024,107

(22) Filed: Jun. 29, 2018

(65) Prior Publication Data

US 2020/0004852 A1  Jan. 2, 2020

(51) Int. Cl.
*G06F 16/00* (2019.01)
*G06F 16/22* (2019.01)
*G06F 11/14* (2006.01)
*G06F 16/11* (2019.01)

(52) U.S. Cl.
CPC ...... *G06F 16/2246* (2019.01); *G06F 11/1446* (2013.01); *G06F 11/1448* (2013.01); *G06F 16/11* (2019.01); *G06F 2201/80* (2013.01); *G06F 2201/84* (2013.01); *G06F 2212/466* (2013.01)

(58) Field of Classification Search
CPC ........ G06F 3/067; G06F 3/064; G06F 3/0644; G06F 3/0643; G06F 11/1451; 11/1435; G06F 11/1469; G06F 11/1446; G06F 11/1448; G06F 11/1458; G06F 17/30194; G06F 17/30575; G06F 17/30088; G06F 17/30312; G06F 17/30159; G06F 17/30327; G06F 17/30067; G06F 17/30171; G06F 17/30106; G06F 17/30221; G06F 17/30584; G06F 17/301; G06F 17/30309; G06F 17/30589; G06F 17/30961; G06F 17/30997; G06F 2201/84; G06F 2201/80; G06F 8/658; Y10S 707/99938; H04L 67/1097; H04L 67/1095
See application file for complete search history.

(56) References Cited

U.S. PATENT DOCUMENTS 8,266,114 B2 * 9/2012 Mace ................. G06F 11/1435 707/692
9,824,095 B1   11/2017 Taylor
9,916,203 B1 * 3/2018 Pogde ................ G06F 11/1448
(Continued)

OTHER PUBLICATIONS

Lee et al: "On-Demand Snapshot: An Efficient Versioning File System for Phase-Change Memory II", IEEE Transactions on Knowledge and Data Engineering., vol. 25, No. 12, Dec. 2013 (Dec. 2013), pp. 2841-2853.

(Continued)

*Primary Examiner* — Diedra McQuitery
(74) *Attorney, Agent, or Firm* — Van Pelt, Yi & James LLP

(57) ABSTRACT

A size associated with a content file is determined to be greater than a threshold size. In response to the determination, file metadata of the content file split and stored across a plurality of component file metadata structures. The file metadata of the content file specifies tree structure organizing data components of the content file and each component file metadata structure of the plurality of component file metadata structures stores a portion of the tree structure. A snapshot tree is updated to reference the plurality of component file metadata structures for the content file.

19 Claims, 18 Drawing Sheets

(56) References Cited

U.S. PATENT DOCUMENTS

| | | | |
|---|---|---|---|
| 9,959,138 B1* | 5/2018 | Vaish | G06F 9/5011 |
| 10,078,583 B1* | 9/2018 | Wallace | G06F 11/1076 |
| 2013/0198317 A1* | 8/2013 | Grube | G06F 11/2094 |
| | | | 709/215 |
| 2014/0013046 A1 | 1/2014 | Corbett | |
| 2015/0134879 A1* | 5/2015 | Zheng | G06F 3/065 |
| | | | 711/103 |
| 2015/0356110 A1* | 12/2015 | Lin | G06F 17/30171 |
| | | | 707/704 |
| 2016/0034356 A1* | 2/2016 | Aron | G06F 16/2246 |
| | | | 707/649 |
| 2016/0070644 A1* | 3/2016 | D'Sa | G06F 3/0611 |
| | | | 711/5 |
| 2017/0272209 A1* | 9/2017 | Yanovsky | H04L 67/1097 |
| 2017/0344590 A1 | 11/2017 | Aron | |

OTHER PUBLICATIONS

Ungureanu et al: "HydraFS: a High-Throughput File System for the HYDRAstor Content-Addressable Storage System", USENIX, Jan. 14, 2010 (Jan. 14, 2010), pp. 1-14.

* cited by examiner

LARGE CONTENT FILE OPTIMIZATION

BACKGROUND OF THE INVENTION

A file system is used to control how data is stored on and retrieved from a storage medium. Without a file system, information placed in the storage medium would be one large body of data with no way to tell where one content file stops and the next begins. A file system is responsible for organizing files and directories, and keeping track of which areas of the storage medium belong to which content file and which are not being used.

A file system stores all the file metadata associated with a content file, including the file name, the length of the contents of the content file, and the location of the content file, separate from the contents of the file. A write-lock may be required to modify the content file and its associated metadata. However, in some instances, only a single write-lock may be obtained. As a result, it may take a lot of time to write and/or modify the metadata and contents associated with a large content file (e.g., 100 TB).

BRIEF DESCRIPTION OF THE DRAWINGS

Various embodiments of the invention are disclosed in the following detailed description and the accompanying drawings.

DETAILED DESCRIPTION

Figure 1:
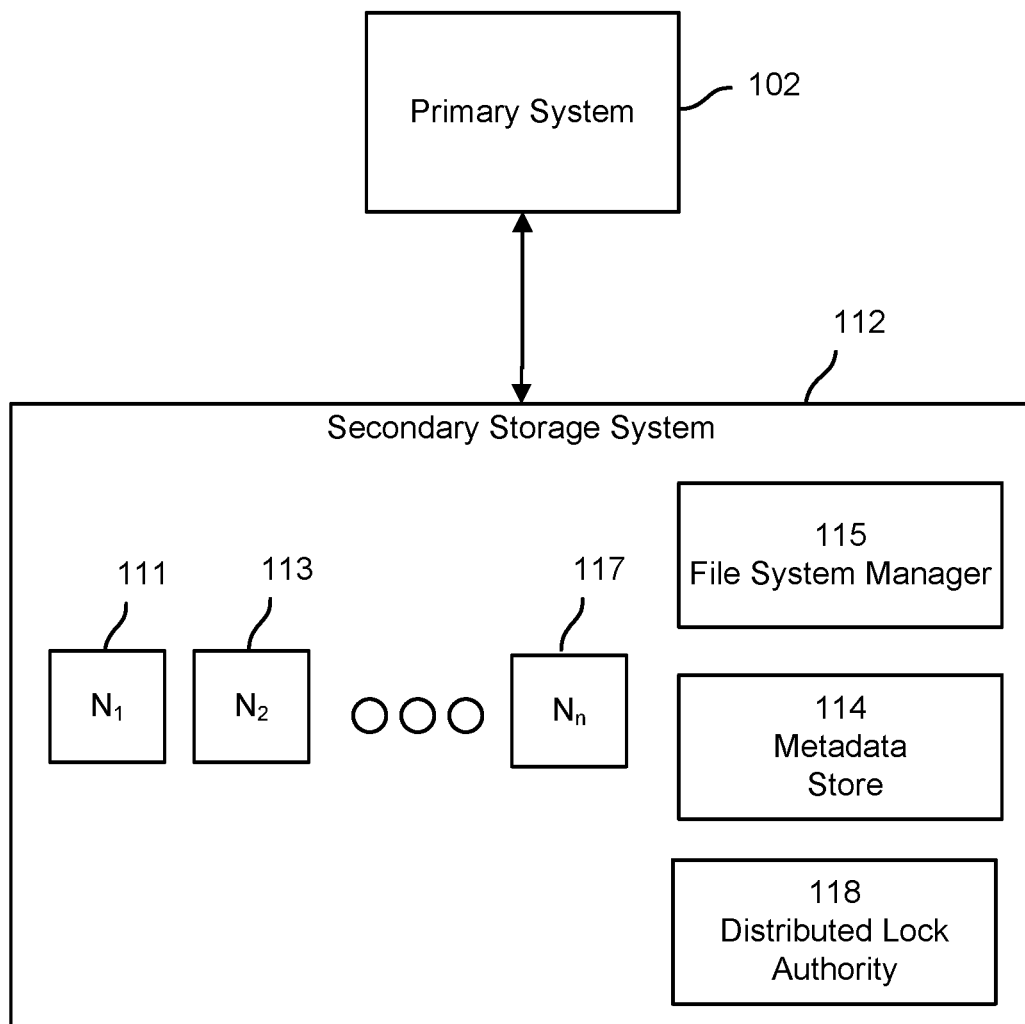
FIG. 1 is a block diagram illustrating an embodiment of a system for large content file optimization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system comprises an object, virtual machine, physical entity, file system, array backup, and/or volume that stores file system data. The file system data is comprised of a plurality of content files and associated metadata. The primary system may perform a backup snapshot of file system data according to a backup policy and send the backup snapshot to a secondary storage system. A backup snapshot represents the state of a system at a particular point in time (e.g., the state of the file system data). The backup snapshot policy may require a full backup snapshot or an incremental backup snapshot to be performed. A full backup snapshot includes the entire state of the primary system at a particular point in time. An incremental backup snapshot includes the state of the primary system that has changed since a last backup snapshot.

A secondary storage system may be comprised of a plurality of storage nodes. A secondary storage system may receive and store the backup snapshot across the plurality of storage nodes. A file system manager of the secondary storage system may organize the file system data of the backup snapshot using a tree data structure. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot is comprised of a snapshot tree and a plurality of file trees (e.g., file metadata structures). Regardless if the view of the file system data corresponds to a full backup snapshot or an incremental backup snapshot, the view of the file system data corresponding to the backup snapshot provides a fully hydrated backup snapshot. A fully hydrated backup snapshot provides a complete view of the primary system at a moment in time corresponding to when the backup snapshot was performed.

A snapshot tree includes a root node, one or more levels of one or more intermediate nodes associated with the root node, and one or more leaf nodes associated with an intermediate node of the lowest intermediate level. The nodes of the snapshot tree are stored in a distributed manner such that the nodes are stored across the plurality of storage nodes comprising the secondary storage system. The root node of a snapshot tree includes one or more pointers to one or more intermediate nodes. Each intermediate node includes one or more pointers to other nodes (e.g., a lower intermediate node or a leaf node). A leaf node may store file system metadata, file metadata associated with a content file that is less than or equal to a limit size (e.g., 256 kB), an identifier of a data brick, a pointer to a file tree (e.g., Blob structure), or a pointer to a data chunk stored on the secondary storage system. A leaf node may correspond to a data brick. The data brick may have a corresponding brick number.

The tree data structure may be used to capture different versions of backup snapshots. The tree data structure allows a chain of snapshot trees corresponding to different backup versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot. The snapshot tree provides a view of the file system data corresponding to the backup snapshot.

File metadata associated with a content file that is greater than the limit size (e.g., 256 kB) has an associated file tree (e.g., file metadata structure). The file tree is configured to store the file metadata associated with a content file. The file tree includes a root node, one or more levels of one or more intermediate nodes associated with the root node, and one or more leaf nodes associated with an intermediate node of the lowest intermediate level. A file tree is similar to a snapshot tree, but a leaf node of a file tree includes an identifier of a data brick storing one or more data chunks of the file or a pointer to the data brick storing one or more data chunks of the content file. The location of the data brick may be identified using a table stored in a metadata store that matches brick numbers to a physical storage location or the location of the data brick may be identified based on the pointer to the data brick. A leaf node of a snapshot tree corresponding to a view of the file system data may include a pointer to the root node of a file tree. In some embodiments, the data chunks associated with a content file are distributed and stored across the plurality of storage nodes comprising the secondary storage system. In other embodiments, the data chunks associated with a content file are stored on a single storage node of the secondary storage system.

The secondary storage system may receive a file system operation request and assign one of the plurality of storage nodes to handle the request. A requesting entity, such as one of the storage nodes, may request access to file system data stored on the secondary storage system. The requesting entity may desire to write, read, modify, and/or delete the contents associated with a content file or file metadata associated with the content file. A distributed lock authority is configured to provide synchronization locks to nodes in the tree data structure. A distributed lock authority may require the requesting entity to obtain a lock to perform a file system operation. The distributed lock authority is configured to provide at least two types of locks: a read-lock and a write-lock. A requesting entity that holds a read-lock on a particular node is allowed to read the contents of that node, but is not allowed to modify that node. A requesting entity that holds a write-lock on a particular node is allowed to both read and modify the contents of that node. Only one requesting entity may obtain a write-lock on any particular node. More than one requesting entity may hold a read-lock on any particular node.

File system metadata may be accessed by traversing a snapshot tree from a root node to a leaf node storing the desired file system metadata. The requesting entity may be required to hold a read-lock to read the file system metadata stored in a leaf node of a snapshot tree. The requesting entity may also be required to hold a write-lock to modify/write the file system metadata stored in the leaf node of the snapshot tree.

File data (e.g., the contents of a file) may be accessed by traversing a snapshot tree from a root node of the snapshot tree to a leaf node of the snapshot tree that stores a pointer to a file tree corresponding to the content file (e.g., file metadata structure). To read data associated with a file, a requesting entity may be required to hold a read-lock associated with the leaf node storing a pointer to the file tree corresponding to the content file. A leaf node of the file tree may include a pointer to a brick storing one or more data chunks associated with the content file or an identifier of the brick storing the one or more data chunks associated with the content file.

In a multi-node system, a plurality of nodes may perform file system operations in parallel. For example, a first node may perform a read operation while a second node may perform a write operation. A plurality of nodes may simultaneously hold a read-lock associated with the leaf node of a snapshot tree storing a pointer to the file tree corresponding to the content file. However, to write and/or modify the file metadata associated with a content file, a requesting entity may be required to hold a write-lock associated with the leaf node of a snapshot tree storing a pointer to the file tree corresponding to the content file, i.e., a pointer to a file metadata structure associated with the content file. Only a single node may hold a write-lock associated with the leaf node of a snapshot tree storing a pointer to the file tree corresponding to the content file.

One or more content files associated with a version of file system data may be larger than a threshold size (e.g., 100 TB). Such files may be referred hereinafter to as "large content files." An example of a large content file is a volume of a virtual machine. Each large content file may have a corresponding file tree included in the version of file system data. The file tree is configured to store the file metadata associated with a content file. Creating and/or modifying the file tree corresponding to a large content file may take a long time to perform because the file tree creation and/or modification(s) cannot be performed in parallel by a plurality of storage nodes of the multi-node system because only a single node may hold a write-lock to a leaf node of a snapshot tree that points to the file tree corresponding to the large content file. As a result, the nodes of a file tree are created and/or modified by a single storage node in sequence rather than in parallel by a plurality of storage nodes.

For example, a backup snapshot may be performed and the data associated with a new content file is stored to the secondary storage system. The file system manager is configured to generate a file tree (e.g., file metadata structure) corresponding to the new content file. The file tree stores the file metadata associated with the content file. The file system manager may generate a new leaf node for the snapshot tree corresponding to the backup snapshot. The file system manager may configure the new leaf node to include a pointer to the file tree corresponding to the new content file. To generate the file tree corresponding to the new content file, the file system manager may be required to obtain a write-lock associated with the new leaf node of the snapshot tree. Because only a single entity (e.g., storage node) may hold a write-lock associated with the new leaf node, generating the file tree corresponding to the new content file must be performed in a sequential manner. For large content files, generating a file tree corresponding to a new content file may take a long period of time to perform.

In another example, a backup snapshot may be performed and a content file may have undergone a plurality of modifications since a previous backup snapshot. Because only a single entity (e.g., storage node) may hold a write-lock associated with the leaf node of a snapshot tree storing a pointer to the file tree corresponding to the modified content file, the plurality of modifications must be performed in a sequential manner. For large content files, modifying a content file and its associated metadata may take a long period of time to perform. This is a bottleneck for the secondary storage system because the secondary storage system may have a large number of file system operations associated with content files and associated metadata to perform.

The large content file optimization technique disclosed herein may reduce the amount of time to create and/or modify a file tree associated with a content file because it enables the creation and/or modifications to be performed in parallel instead of in sequence.

In some embodiments, a backup snapshot comprising file system data is received. The file system data is comprised of a plurality of content files. At least one of the content files is larger than a threshold size. The at least one content file may be a content file that was not previously stored by the secondary storage system. A file system manager is configured to generate a view of the file system data corresponding to the backup snapshot. The view includes a snapshot tree and one or more file trees. A leaf node of a snapshot tree may include a pointer to a file tree. For a content file that is larger than the threshold size, the file system manager is configured to generate a plurality of file trees for the large content file. One of the generated file trees corresponds to a portion of the large content file. For example, a first file tree may correspond to a first portion of the large content file, a second file tree may correspond to a second portion of the large content file . . . a nth file tree may correspond to a nth portion of the large content file. Each file tree is configured to store a corresponding portion of the file metadata associated with the large content file. A leaf node of generated file tree includes a pointer to a brick storing one or more data chunks associated with the large content file. The file system manager may generate a corresponding snapshot tree leaf node for the plurality of file trees corresponding to the large content file. A corresponding snapshot tree leaf node includes a pointer to a file tree corresponding to a portion of the large content file. Because there are multiple leaf nodes in the snapshot tree with pointers to file trees corresponding to different portions of the large content file, the file metadata associated with the large content file may be written in parallel by a plurality of storage nodes. In some embodiments, a user associated with the backup snapshot may indicate that a content file is a large content file. In other embodiments, a file system manager may determine that a content file is a large content file based on the received data associated with the content file.

In other embodiments, a content file is associated with one or more previous backup snapshots and stored on the secondary storage system. When the one or more previous backup snapshots were performed, the size of the content file may be less than the threshold size (e.g., not a large content file), but when the current backup snapshot is performed, the size of the same content file may be greater than or equal to the threshold size (e.g., a large content file). In some embodiments, a new file tree is generated for the portion of the content file that was included in the current backup snapshot. In other embodiments, the previously stored and new contents of the large content file are determined, a plurality of file trees are generated for the large content file (e.g., file trees for the old and new portions of the large content file), and the file metadata associated with the large content file is distributed between the plurality of file trees. A view of the file system data corresponding to a previous backup may include a snapshot tree leaf node that includes a pointer to the file tree corresponding to the previously small, but now large content file. The view of the file system data corresponding to the current backup may not include the snapshot tree leaf node that includes a pointer to the previous version of the file tree corresponding to the previously small, but now large content file; instead the view of the file system data corresponding to the current backup may include snapshot tree leaf nodes that include corresponding pointers to the new file trees corresponding to the content file (i.e., a plurality of file trees corresponding to old and new portions of the large content file are generated).

In other embodiments, a maintenance process may be scheduled to determine one or more large content files associated with a stored backup snapshot. The one or more large content files may be determined by traversing a snapshot tree associated with the stored backup snapshot. A leaf node of a snapshot tree may store data indicating a size of a content file. One or more file trees of the stored backup snapshot that correspond to large content files are identified. A view of the file system data may be generated such that the file trees corresponding to the large content files are divided into a plurality of smaller file trees. This may performed as a proactive measure to reduce the amount of time needed to perform future file system operations associated with the large content files. For example, a stored backup snapshot may include a large content file. A view corresponding to the stored backup snapshot may include a single file tree for the large content file. A future backup snapshot may include a plurality of modifications to the metadata associated with the large content file. Because only a single entity may hold a write-lock associated with the leaf node storing a pointer to the file tree corresponding to the large content file, the plurality of modifications to the metadata associated with the large content file must be performed in a sequential manner By proactively splitting the file tree corresponding to a large content file into a plurality of smaller file trees, the plurality of modifications to the metadata associated with the large content file may be performed in parallel by a plurality of storage nodes and the amount of time needed to perform the future modifications to the large content file is reduced.

Each file tree corresponds to a portion of the content file. A snapshot tree may be updated to include additional leaf nodes to include pointers to the plurality of smaller file trees. By breaking up a file tree (e.g., file metadata structure) of a large content file into a plurality of smaller file trees (e.g., plurality of file metadata structures), a plurality of modifications to the metadata associated with the content file may be performed in parallel by a plurality of storage nodes instead of in sequence by a single storage node. This reduces the amount of time needed to generate a view of file system data associated with a backup snapshot. The large content file optimization technique reduces the bottleneck associated with updating and/or generating file trees for large content files because the secondary storage system may perform file system operations associated with a file in parallel instead of sequentially.

FIG. 1 is a block diagram illustrating an embodiment of a system for large content file optimization. In the example shown, system 100 includes a primary system 102 and a secondary storage system 112.

Primary system 102 is a computing system that stores file system data. Primary system 102 may be comprised of one or more servers, one or more computing devices, one or more storage devices, and/or a combination thereof. Primary system 102 may be configured to backup file system data to secondary storage system 112 according to one or more backup snapshot policies. In some embodiments, a backup snapshot policy indicates that file system data is to be backed up on a periodic basis (e.g., hourly, daily, weekly, monthly, etc.). In other embodiments, a backup snapshot policy indicates that file system data is to be backed up when a threshold size of data has changed. In other embodiments, a backup snapshot policy indicates that file system data is to be backed up upon a command from a user associated with primary system 102. The backup snapshot policy may indicate when a full backup snapshot of primary system 102 is to be performed. A full backup snapshot stores the entire state of the primary system, (i.e., all of the file system data) at a particular point in time. The backup snapshot policy may indicate when an incremental backup snapshot of primary system 102 is to be performed. An incremental backup snapshot stores the one or more data chunks of file system data that have changed since a last backup snapshot.

Secondary storage system 112 is a storage system configured to store file system data received from primary storage system 102. Secondary storage system 112 may protect a large volume of applications while supporting tight business requirements (recovery time objective (RTO) and recovery point objective (RPO)). Secondary storage system 112 may unify end-to-end protection infrastructure—including target storage, provide backup, replication of data, disaster recovery, and/or cloud tiering. Secondary storage system 112 may provide scale-out, globally deduped, highly available storage to consolidate all secondary data, including backups, files, and test/dev copies. Secondary storage system 112 simplifies backup infrastructure and eliminates the need to run separate backup software, proxies, media servers, and archival. Secondary storage system 112 may be fully integrated with a virtual machine (VM) centralized management tool, such as vCenter, and an applications programming interface (API) for data protection. Secondary storage system 112 may reduce the amount of time to perform RPOs and support instantaneous RTOs by creating a clone of a backup VM and running the VM directly from secondary storage system 112. Secondary storage system 112 may integrate natively with one or more cloud servers. Secondary storage system 112 may replicate data to a one or more cloud clusters to minimize potential data loss by replicating data as soon as a backup is completed. This allows data in the cloud to be used for disaster recovery, application migration, test/dev, or analytics.

Secondary storage system 112 may be comprised of one or more storage nodes 111, 113, 117. The one or more storage nodes may be one or more solid state drives, one or more hard disk drives, or a combination thereof. The file system data included in a backup snapshot may be stored in one or more of the storage nodes. In one embodiment, secondary storage system 112 is comprised of one solid state drive and three hard disk drives.

Secondary storage system 112 may include a file system manager 115. File system manager 115 is configured to organize the file system data in a tree data structure. The tree data structure may include one or more leaf nodes that store a data key-value pair. A user may request a particular value by providing a particular data key to file system manager 115, which traverses a snapshot tree to find the value associated with the particular data key. A user may request a set of files within a particular range of data keys of a snapshot. File system manager 115 may be configured to generate a view of file system data based on a backup snapshot received from primary system 102. File system manager 105 may be configured to perform one or more modifications, as disclosed herein, to a snapshot tree.

A tree data structure may be used to capture different versions of backup snapshots. The tree data structure allows a chain of snapshot trees corresponding to different backup versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot. The snapshot tree provides a view of the file system data corresponding to a backup snapshot.

A snapshot tree includes a root node, one or more levels of one or more intermediate nodes associated with the root node, and one or more leaf nodes associated with an intermediate node of the lowest intermediate level. The nodes of a snapshot tree may be stored across the plurality of storage nodes 111, 113, 117. The root node of a snapshot tree includes one or more pointers to one or more intermediate nodes. Each intermediate node includes one or more pointers to other nodes (e.g., a lower intermediate node or a leaf node). A leaf node may store file system metadata, file metadata associated with a content file that is less than or equal to a limit size (e.g., 256 kB), an identifier of a data brick, a pointer to a file tree (e.g., Blob structure), or a pointer to a data chunk stored on the secondary storage system. A leaf node may correspond to a data brick. The data brick may have a corresponding brick number.

File metadata associated with a content file that is smaller than or equal to a limit size may be stored in a leaf node of the snapshot tree. File metadata associated with a content file that is larger than the file limit may be stored across the one or more storage nodes 111, 113, 117. A corresponding file tree may be generated for each of the file metadata associated with a content file that is larger than the limit size. The data of a content file may be divided into a plurality of bricks. A leaf node of a file tree may correspond to one of the plurality of bricks. A leaf node of the file tree may include a pointer to a storage location for the brick. In some embodiments, the size of a brick is 256 kB.

File system manager 115 may be configured to perform file maintenance. Each node of a view of file system data corresponding to a backup snapshot has an associated reference count. The reference count indicates a number of views that reference a node of the view. A retention time policy may indicate when a view of file system data corresponding to a backup snapshot is to be deleted. A root node of a file tree (e.g., file metadata structure) includes an associated reference count. This represents the number of versions of file system data corresponding to a backup snapshot that include the file corresponding to the file tree. The reference count of the root node indicates a number of leaf nodes of different views that reference the root node. A large content file may be split across a plurality of file trees. A view of a snapshot may include a plurality of leaf nodes that include corresponding pointers to the plurality of file trees. In some embodiments, the corresponding reference count of the root nodes for the large content file is the equal. This ensures that the large content file remains intact for a particular view. In other embodiments, the corresponding reference count of the root nodes for the large content file is based on a number of views that reference the corresponding root node.

When a retention time policy condition is satisfied, file system manager 115 may identify the one or more content files associated with a backup snapshot and associated metadata to be deleted by traversing the view of file system data corresponding to the backup snapshot to be deleted. A reference count associated with each of the nodes is decremented. After the reference count associated with the nodes has been decremented, the file system manager may determine to delete content files and associated metadata with a reference count of "0" and to keep content files with a reference count that is greater than "0." In some embodiments, when a reference count of a root node of a file tree is "0" and deleted, a leaf node of a snapshot tree that points to the root node is also deleted.

Metadata store 114 may store the view of file system data corresponding to a backup snapshot. Metadata store 114 may also store file metadata associated with a content file that is smaller than a limit size. Metadata store 114 may include a map that matches file trees to their corresponding portions of a large content file.

Distributed lock authority 118 is configured to issue locks. Distributed lock authority 118 is configured to provide synchronization locks to nodes in the tree data structure. Distributed lock authority 118 may require the requesting entity (e.g., one of the storage nodes 111, 113, 117) to obtain a lock to perform a file system operation. Distributed lock authority 118 is configured to provide at least two types of locks: a read-lock and a write-lock. A requesting entity that holds a read-lock on a particular node of a snapshot tree is allowed to read the contents of that node, but is not allowed to modify that node. A requesting entity that holds a write-lock on a particular node of a snapshot tree is allowed to both read and modify the contents of that node. Only one requesting entity may obtain a write-lock on any particular node. More than one requesting entity may hold a read-lock on any particular node. A write-lock is needed to modify the value associated with a leaf node of a snapshot tree and/or file tree.

Figure 2A:
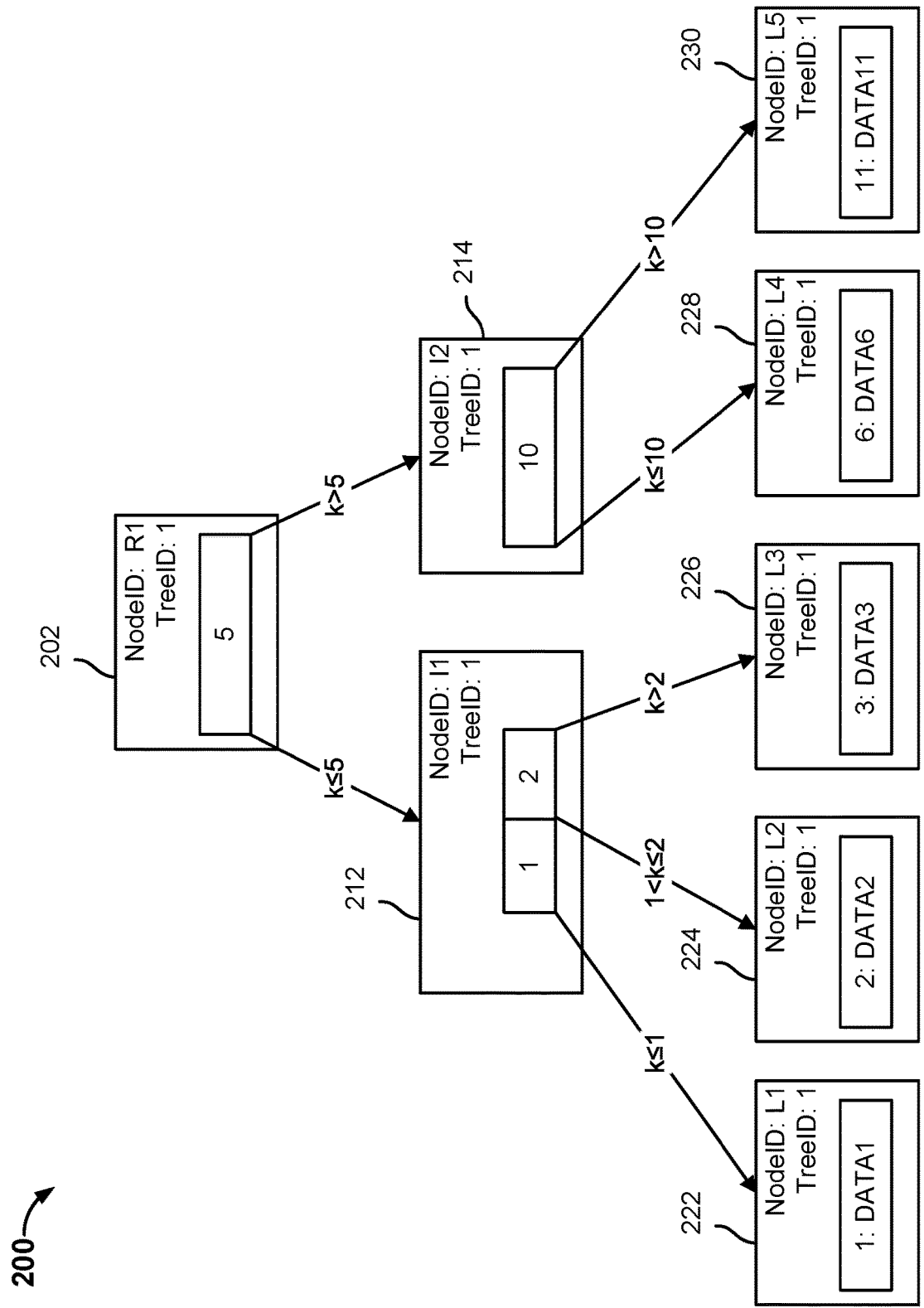
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 112. The file system data may include metadata for a distributed file system and may include information, such as chunk identifier, chunk offset, file size, directory structure, file permissions, physical storage locations of the content files, etc. A file system manager, such as file system manager 115, may generate tree data structure 200.

Tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time t0. The backup snapshot may be received from a primary system, such as primary system 102. The snapshot tree in conjunction with a plurality of file trees may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key.

In other embodiments, a leaf node is configured to store the file metadata associated with a content file when the size the metadata is less than or equal to a limit size. For example, the file metadata associated with a content file that is smaller than or equal to 256 kB may reside in the leaf node of a snapshot tree. In some embodiments, a leaf node includes a pointer to a file tree (e.g., blob structure) when the size of file metadata associated with a content file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "5." To find a leaf node storing a value associated with a data key of "6" or "11," the second branch of root node 202 would be traversed to intermediate node 214 because data keys "6" and "11" are greater than the node key of "5."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store metadata when the size of file metadata associated with a content file is less than or equal to a limit size. In other embodiments, leaf node 222 is configured to store a pointer to a file tree (e.g., file metadata structure).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store metadata when the size of file metadata associated with a content file is less than or equal to a limit size. In other embodiments, leaf node 224 is configured to store a pointer to a file tree (e.g., file metadata structure).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store metadata when the size of file metadata associated with a content file is less than or equal to a limit size. In other embodiments, leaf node 226 is configured to store a pointer to a file tree (e.g., file metadata structure).

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store metadata when the size of file metadata associated with a content file is less than or equal to a limit size. In other embodiments, leaf node 228 is configured to store a pointer to a file tree (e.g., file metadata structure).

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store metadata when the size of file metadata associated with a content file is less than or equal to a limit size. In other embodiments, leaf node 230 is configured to store a pointer to a file tree (e.g., file metadata structure).

Figure 2B:
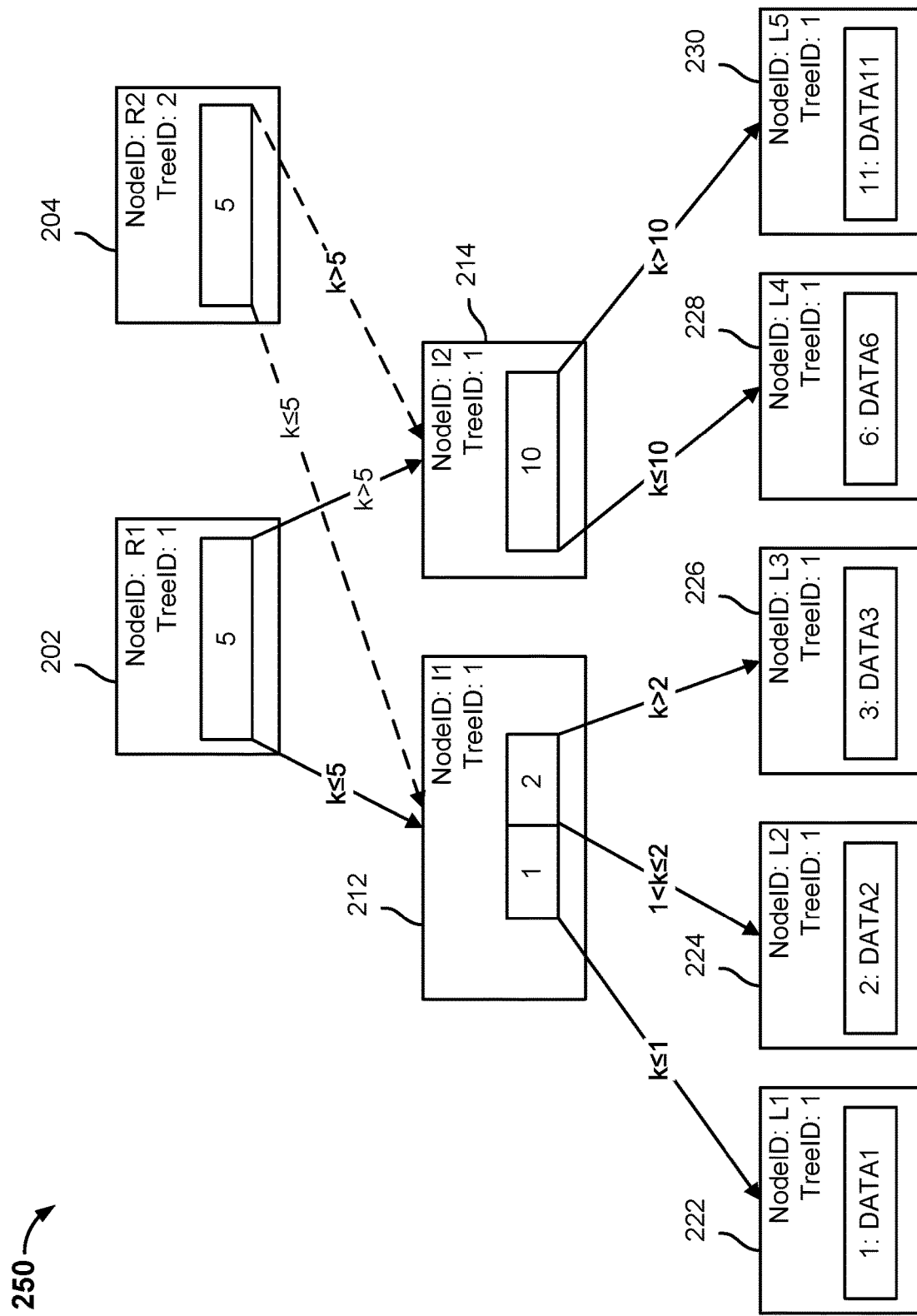
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In some embodiments, to create a snapshot of the file system at time t+n, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable) . In some embodiments, a root node associated with a previous snapshot view is removed from the snapshot tree after a backup snapshot is performed (e.g., root node 202 is removed after root node 204 is added).

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2." The NodeID identifies the name of the node. The TreeID identifies the backup snapshot with which the node is associated.

Figure 2C:
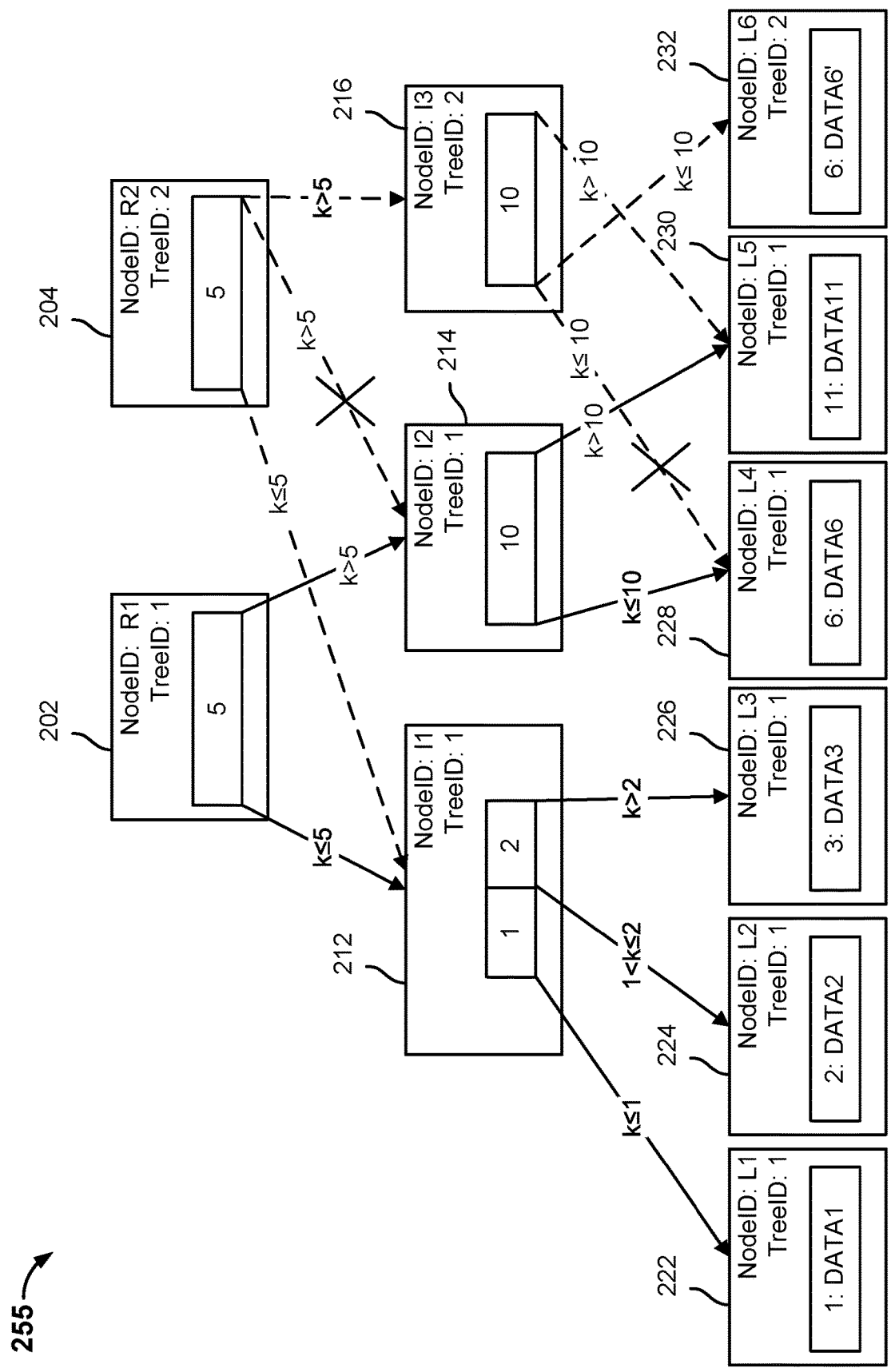
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. A snapshot tree with a root node 204 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA6" has been modified to be "DATA6'." In some embodiments, the value of DATA6' includes pointers to a plurality of file trees corresponding to different portions of a large content file. In some embodiments, the value of a key value pair has been modified. In other embodiments, the value of the key pair is the data of file metadata associated with a content file that is smaller than or equal to a limit size. In other embodiments, the value of the key value pair points to a different file tree. The different file tree may be a modified version of the file tree that the leaf node previously pointed.

At $t_2$, the file system manager starts at root node 204 because that is the root node associated with snapshot tree at time $t_2$ (i.e., the root node associated with the last backup snapshot). The value "DATA6" is associated with the data key "6." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6'" and includes the same TreeID as root node 204. The file system manager updates a pointer of intermediate node 216 to point to leaf node 232 instead of pointing to leaf node 228.

In some embodiments, leaf node 232 stores the value of a key value pair has been modified. In other embodiments, leaf node 232 stores the modified file metadata associated with a content file that is smaller than or equal to a limit size. In other embodiments, leaf node 232 stores a pointer to a file tree corresponding to the modified content file that is greater than a threshold size.

Figure 2D:
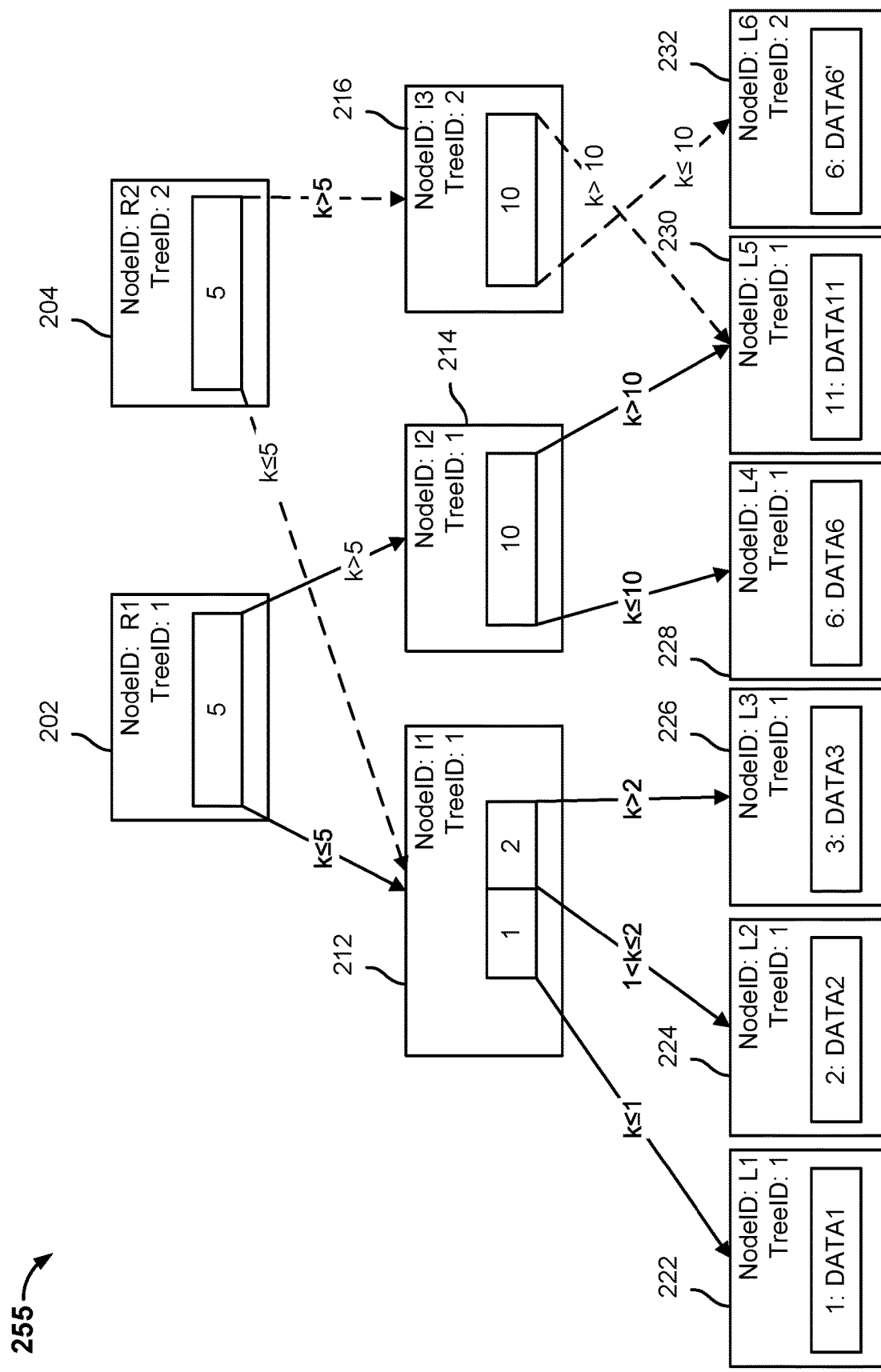
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 2E:
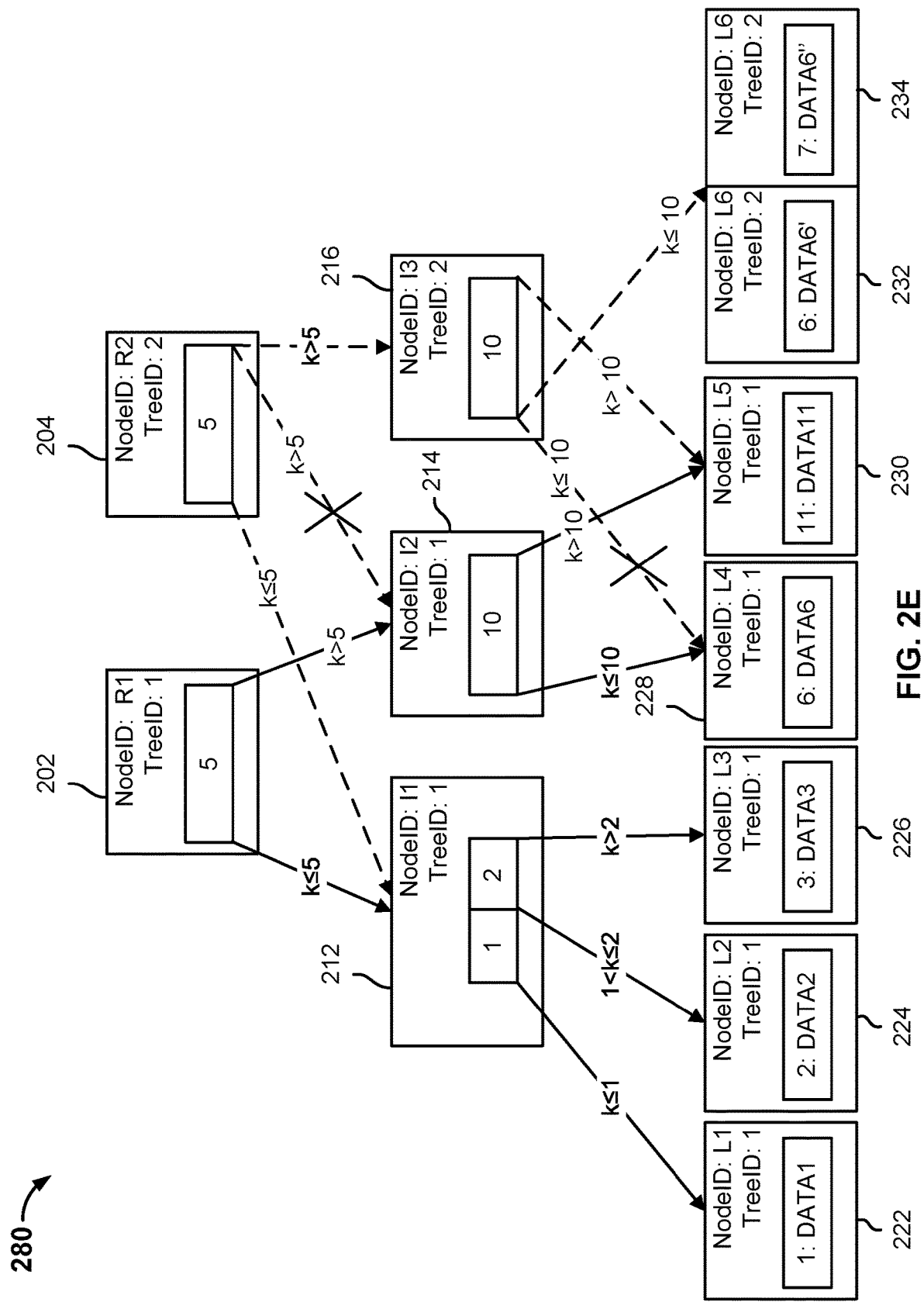
FIG. 2E is a block diagram illustrating an embodiment of modifying a snapshot tree.

FIG. 2E is a block diagram illustrating an embodiment of modifying a snapshot tree. In the example shown, tree data structure 280 may be modified by a file system manager, such as file system manager 115. A leaf node may include a pointer to a file tree. In some embodiments, the file tree corresponds to a large content file. To reduce the amount of time needed to update a file tree associated with a large content file, the file tree associated with the large content file may be split into a plurality of file trees.

In the example shown, leaf node 228 includes a pointer to a file tree associated with a large content file. Leaf node 228 has a TreeID of "1" and is associated with a first backup snapshot. When a second backup snapshot is performed, the file tree associated with the large content file may be split into a plurality of file trees and a snapshot tree associated with the second backup snapshot is generated to reflect the file split.

In the example shown, "DATA6" includes a pointer to a file tree corresponding to a large content file. The file tree corresponding to the large content file has been split into a plurality of file trees. In this example, the large content file tree has been split into two file trees. The snapshot tree associated with the second backup snapshot has been modified to reflect that the large content file tree associated with "DATA6" has been split into two file trees. The snapshot tree associated with the second backup snapshot has been modified to include leaf nodes 232, 234. Leaf node 232 includes a data key of "6" and a value of "DATA6'." Leaf node 234 includes a data key of "7" and a value of "DATA6"." "DATA6'" includes a pointer to a file tree corresponding to a first portion of the large content file and "DATA6"" includes a pointer to a file tree corresponding to a second portion of the large content file. In some embodiments, the file tree corresponding to the first portion of the large content file and the file tree corresponding to the second portion of the large content file represent equal amounts of the large content file. In other embodiments, the file tree corresponding to the first portion of the large content file represents a larger portion of the large content file than the file tree corresponding to the second portion of the large content file. In other embodiments, the file tree corresponding to the first portion of the large content file represents a smaller portion of the large content file than the file tree corresponding to the second portion of the large content file. Leaf nodes 232, 234 have a TreeID of "2." This indicates that the leaf nodes are associated with a second view backup snapshot with a TreeID of "2" and not associated with the first backup snapshot with a TreeID of "1."

In the example shown, the value "DATA6" has been modified to be "DATA6'" and "DATA6"." At $t_2$, the file system manager starts at root node 204 because that is the root node associated with snapshot tree at time $t_2$ (i.e., the root node associated with the second backup snapshot). The value "DATA6" is associated with the data key "6." The file system manager traverses snapshot tree 280 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 280 from intermediate node 216 to leaf node 228, determines that the TreeID of leaf node 228 does not match the TreeID of root node 204, and creates two copies of leaf node 228. Leaf node copies 232, 234 store the modified value "DATA6'" and DATA6", respectively, and include the same TreeID as root node 204. The file system manager updates a pointer of intermediate node 216 to point to leaf nodes 232, 234 instead of pointing to leaf node 228.

Figure 2F:
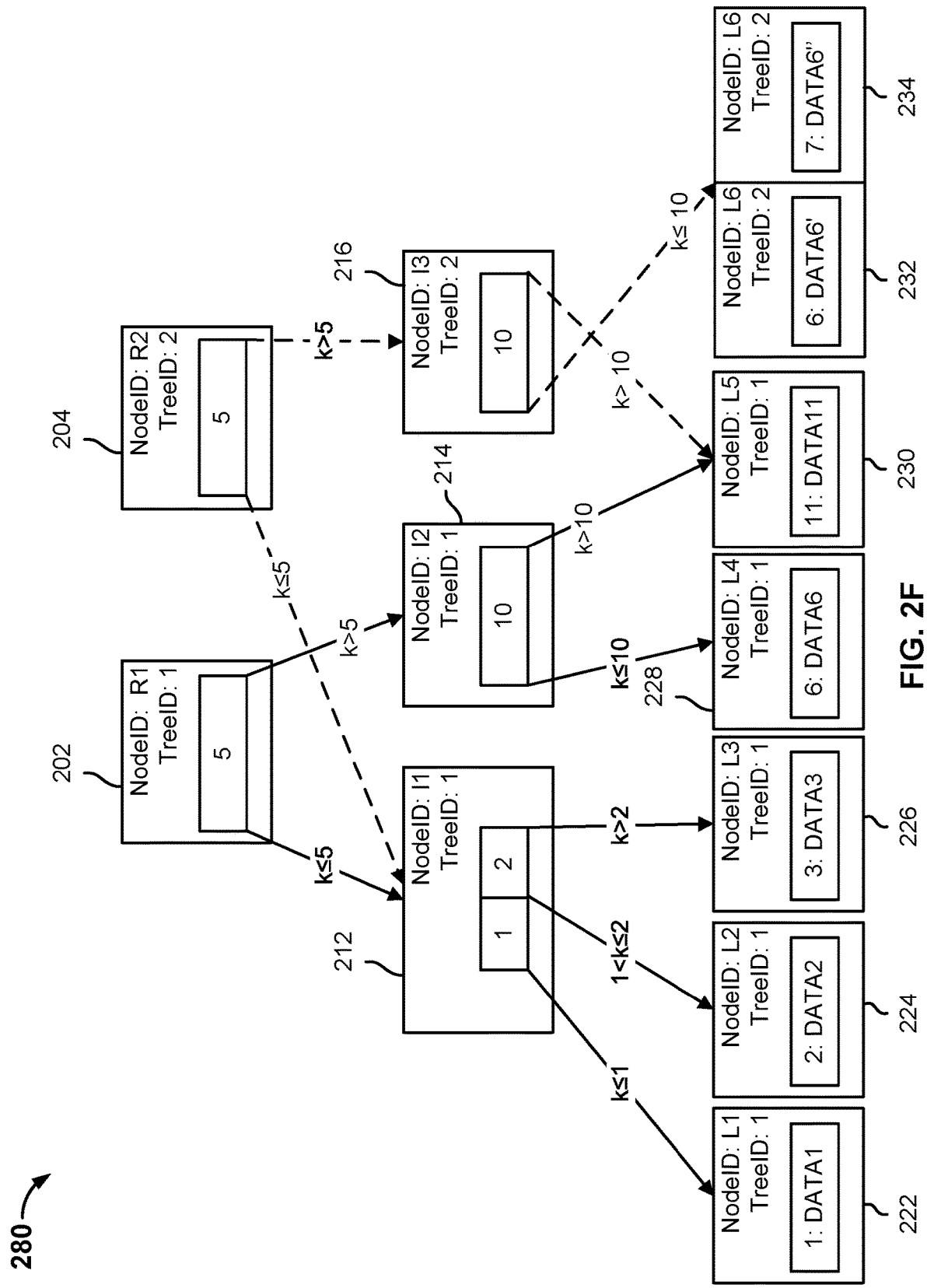
FIG. 2F is a block diagram illustrating an embodiment of a modified snapshot tree.

FIG. 2F is a block diagram illustrating an embodiment of a modified snapshot tree. Tree data structure 280 shown in FIG. 2F illustrates a result of the modifications made to a snapshot tree as described with respect to FIG. 2D.

Figure 3A:
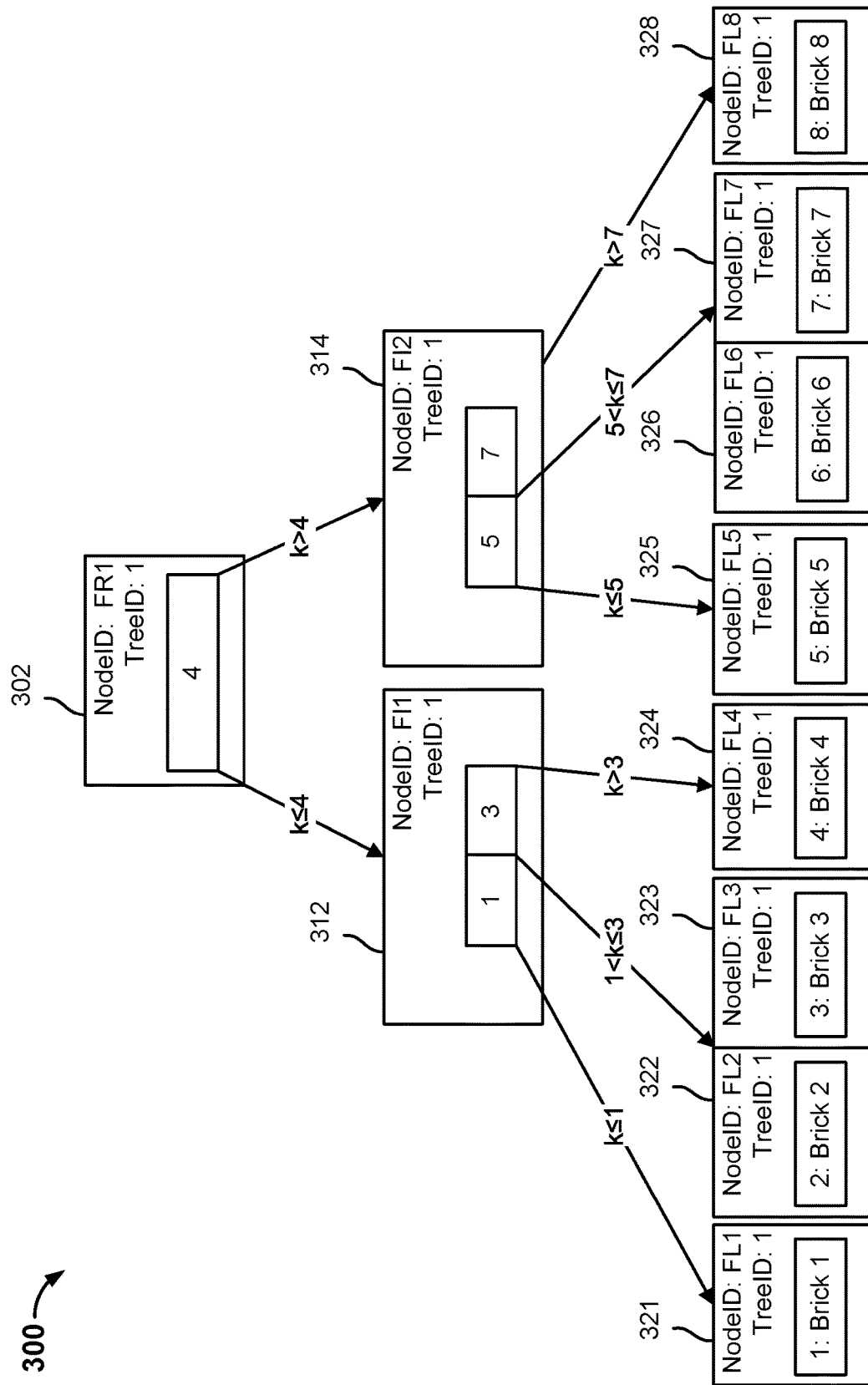
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 112. In the example shown, tree data structure 300 corresponds to a content file and stores the file metadata associated with the content file. The file metadata associated with a content file is stored by a storage system separate from the contents of the file, that is, tree data structure is stored separately from the contents of the file. A leaf node of a snapshot tree associated with file system data, such as a leaf node of tree data structures 200, 250, 255, 280, may include a pointer to a tree data structure corresponding to a content file, such as tree data structure 300. A tree data structure corresponding to a content file (i.e., a "file tree") is a snapshot tree, but is used to organize the data blocks associated with a content file that are stored on the secondary storage system. A file tree may be referred to as a file metadata structure.

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. A tree data structure associated with file system data may include one or more pointers to one or more tree data structures corresponding to one or more content files.

In the example shown, tree data structure 300 includes a file root node 302, file intermediate nodes 312, 314, and file leaf nodes 321, 322, 323, 324, 325, 326, 327, 328. Although tree data structure 300 includes one intermediate level between root node 302 and leaf nodes 321, 322, 323, 324, 325, 326, 327, 328, any number of intermediate levels may be implemented. Similar of the snapshot trees described above, each node includes a "NodeID" that identifies the node and a "TreeID" that identifies a view with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 321, a pointer to leaf node 322, a pointer to leaf node 323, and a pointer to leaf node 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes a pointer to leaf node 325, a pointer to leaf node 326, a pointer to leaf node 327, and a pointer to leaf node 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick storing one or more data chunks associated with a content file corresponding to tree data structure 300. Leaf node 321 includes NodeID of "FL1" and a TreeID of "1." To view the value associated with a data key of "1," tree data structure 300 is traversed from root node 302 to intermediate node 312 to leaf node 321.

Leaf node 322 includes a data key-value pair of "2: Brick 2." "Brick 2" is a brick identifier that identifies the data brick storing one or more data chunks associated with a content file corresponding to tree data structure 300. Leaf node 322 includes NodeID of "FL2" and a TreeID of "1." To view the value associated with a data key of "2," tree data structure 300 is traversed from root node 302 to intermediate node 312 to leaf node 322.

Leaf node 323 includes a data key-value pair of "3: Brick 3." "Brick 3" is a brick identifier that identifies the data brick storing one or more data chunks associated with a content file corresponding to tree data structure 300. Leaf node 323 includes NodeID of "FL3" and a TreeID of "1." To view the value associated with a data key of "3," tree data structure 300 is traversed from root node 302 to intermediate node 312 to leaf node 323.

Leaf node 324 includes a data key-value pair of "4: Brick 4." "Brick 4" is a brick identifier that identifies the data brick storing one or more data chunks associated with a content file corresponding to tree data structure 300. Leaf node 324 includes NodeID of "FL4" and a TreeID of "1." To view the value associated with a data key of "4," tree data structure 300 is traversed from root node 302 to intermediate node 312 to leaf node 324.

Leaf node 325 includes a data key-value pair of "5: Brick 5." "Brick 5" is a brick identifier that identifies the data brick storing one or more data chunks associated with a content file corresponding to tree data structure 300. Leaf node 325 includes NodeID of "FL5" and a TreeID of "1." To view the value associated with a data key of "5," tree data structure 300 is traversed from root node 302 to intermediate node 314 to leaf node 325.

Leaf node 326 includes a data key-value pair of "6: Brick 6." "Brick 6" is a brick identifier that identifies the data brick storing one or more data chunks associated with a content file corresponding to tree data structure 300. Leaf node 326 includes NodeID of "FL6" and a TreeID of "1." To view the value associated with a data key of "6," tree data structure 300 is traversed from root node 302 to intermediate node 314 to leaf node 326.

Leaf node 327 includes a data key-value pair of "7: Brick 7." "Brick 7" is a brick identifier that identifies the data brick storing one or more data chunks associated with a content file corresponding to tree data structure 300. Leaf node 327 includes NodeID of "FL7" and a TreeID of "1." To view the value associated with a data key of "7," tree data structure 300 is traversed from root node 302 to intermediate node 314 to leaf node 327.

Leaf node 328 includes a data key-value pair of "8: Brick 8." "Brick 8" is a brick identifier that identifies the data brick storing one or more data chunks associated with a content file corresponding to tree data structure 300. Leaf node 328 includes NodeID of "FL8" and a TreeID of "1." To view the value associated with a data key of "8," tree data structure 300 is traversed from root node 302 to intermediate node 314 to leaf node 328.

A content file may be comprised of a plurality of data chunks. A brick may store one or more data chunks. In the example shown, leaf nodes 321, 322, 323, 324, 325, 326, 327, 328 each store a corresponding brick identifier. A metadata store may include a data structure that matches a brick identifier with a corresponding location (physical location) of the one or more data chunks comprising the brick.

Figure 3B:
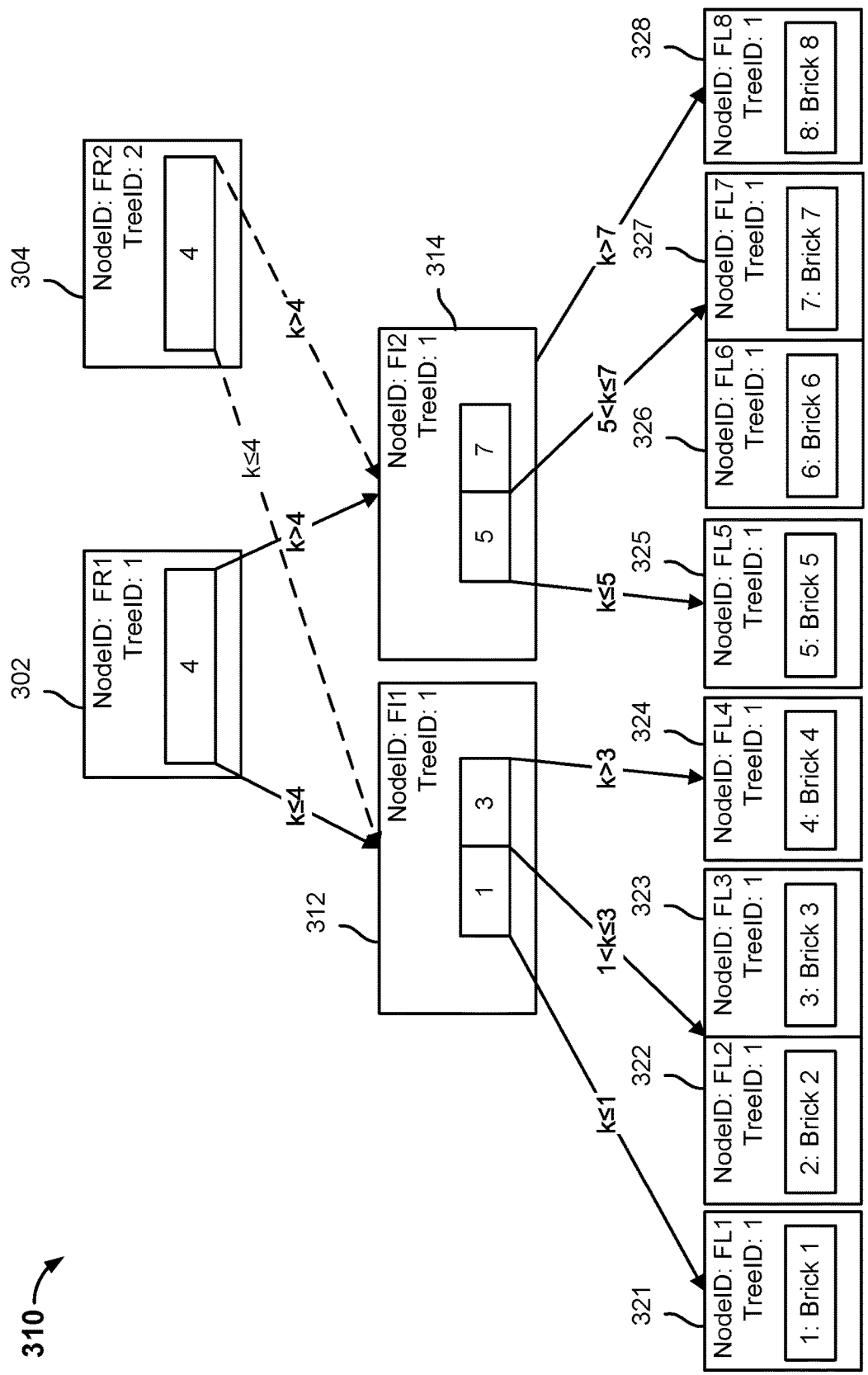
FIG. 3B is a block diagram illustrating an embodiment of adding a file tree to a tree data structure.

FIG. 3B is a block diagram illustrating an embodiment of adding a file tree to a tree data structure. In some embodiments, tree data structure 310 may be created by a storage system, such as secondary storage system 112. A tree data structure corresponding to a content file is a snapshot tree, but stores file metadata associated with the content file. The tree data structure corresponding to a content file can be used to capture different versions of a content file at different moments in time. In some embodiments, the tree data structure allows a chain of file trees corresponding to different versions of a content file to be linked together by allowing a node of a later version of a file tree to reference a node of a previous version of a file tree. A file tree is comprised of a root node, one or more levels of one or more intermediate nodes, and one or more leaf nodes.

A root node or an intermediate node of a version of a file tree may reference an intermediate node or a leaf node of a previous version of a file tree. Similar to the snapshot tree structure, the file tree structure allows different versions of a content file to share nodes and allows changes to a content file to be tracked. When a backup snapshot is received, a root node of the file tree may be linked to one or more intermediate nodes associated with a previous file tree. This may occur when the content file is included in both backup snapshots.

In the example shown, tree data structure 310 includes a file tree comprising root node 302, intermediate nodes 312, 314, and leaf nodes 321, 322, 323, 324, 325, 326, 327, 328. Tree data structure 310 also includes a second file tree that may be a snapshot of file data at a particular point in time t+n, for example at time $t_1$. The second file tree is comprised of root node 304, intermediate nodes 312, 314, and leaf nodes 321, 322, 323, 324, 325, 326, 327, 328. To create a snapshot of the file data at time t+n, a new root node is created. The new root node includes the same set of pointers as the original node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file tree at a particular moment in time. In some embodiments, root node 304 is associated with a current view of the file data. The current view may represent a state of the file data that is up-to-date and is capable of receiving one or more modifications to the file tree that correspond to modifications to the file data. The TreeID of a root node indicates a snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In some embodiments, to create a snapshot of the file data at time t+n, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). For example, a current view of a file tree corresponding to a large content file may be modified when a maintenance process (e.g., splitting the file tree corresponding to the large content file into a plurality of smaller file trees) is performed.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal the node key indicates that traversing a file tree included in tree data structure 310 from root node 304 to intermediate node 312 will lead to a leaf node with a data key of "1," "2," "3," or "4." Root node 304 includes a second set of pointers to intermediate node 314. The second set of pointers associated with a data key greater than the node key indicates that traversing a file tree included in tree data structure 310 from root node 304 to intermediate node 314 will lead to a leaf node with a data key of "5," "6," "7," or "8." Root node 304 includes a NodeID of "FR2" and a TreeID of "2." The NodeID identifies the name of the node. The TreeID identifies the backup snapshot with which the node is associated.

Figure 3C:
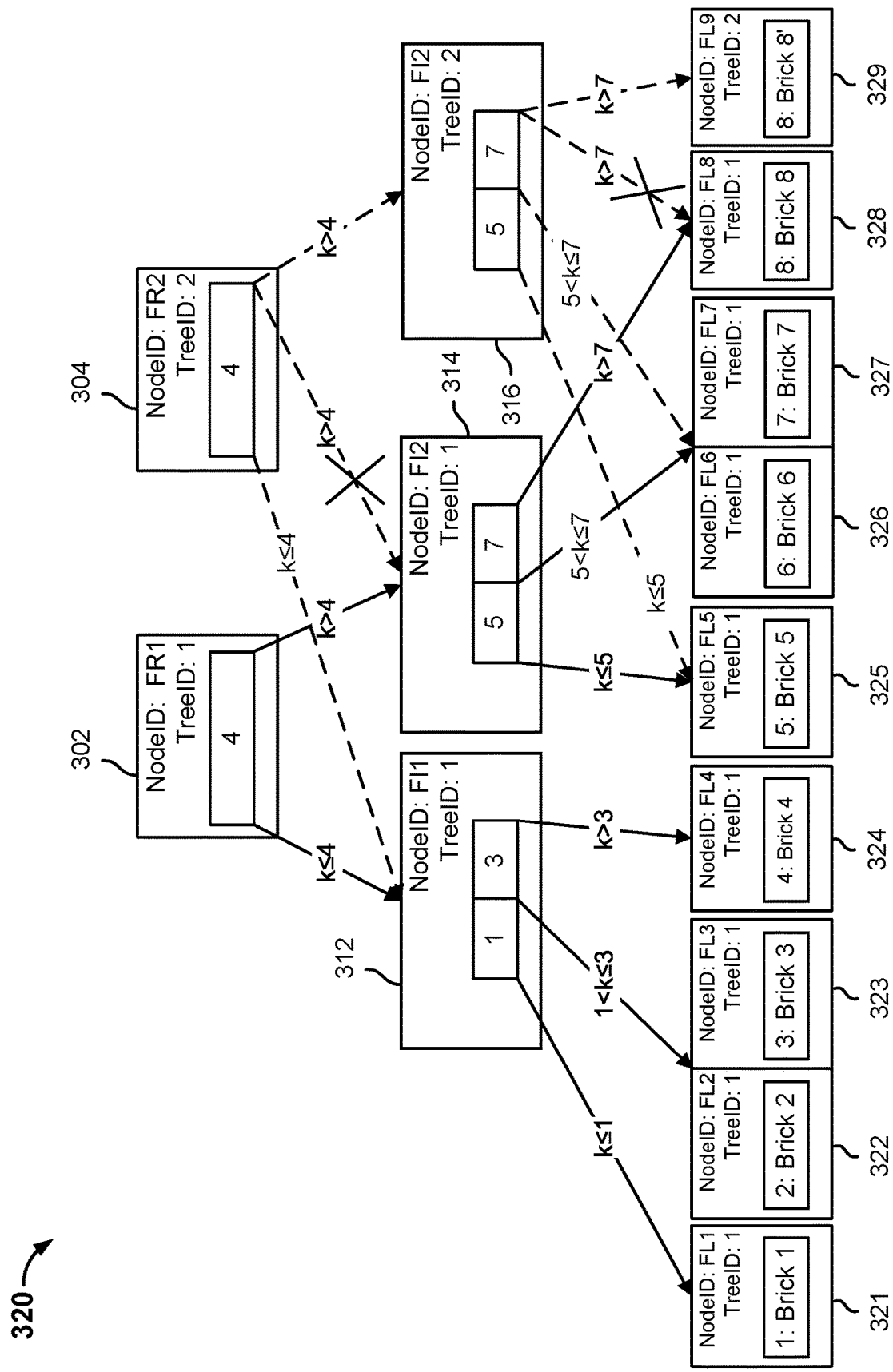
FIG. 3C is a block diagram illustrating an embodiment of modifying a file tree of a tree data structure.

FIG. 3C is a block diagram illustrating an embodiment of modifying a file tree of a tree data structure. In the example shown, tree data structure 320 may be modified by a file system manager, such as file system manager 115. A file tree with root node 304 may be a current view of the file data at time t+n+m, for example, at time $t_2$. A current view may represent a state of the file data that is up-to-date and capable of receiving one or more modifications to the file tree that correspond to modifications to the file system data. Because a snapshot represents a perspective of the file data that is "frozen" in time, one or more copies of one or more nodes affected by a change to file data, are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file tree stores a brick identifier associated with a particular brick storing the data chunk. To represent this modification to the file data, a corresponding modification is made to a current view of a file tree. The current view of the file tree is modified because the previous file tree is a snapshot view and can no longer be modified. The data chunk of the file data that was replaced has a corresponding leaf node in the previous file tree. A new leaf node in the current view of the file tree is created, as described herein, that corresponds to the new data chunk. The new leaf node includes an identifier associated with the current view. The new leaf node may also store the chunk identifier associated with the modified data chunk.

In the example shown, a data chunk included in "Brick 8" has been modified. The data chunk included in "Brick 8" has been replaced with a data chunk included in "Brick 8'." At $t_2$, the file system manager starts at root node 304 because that is the root node associated with the file tree at time $t_2$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
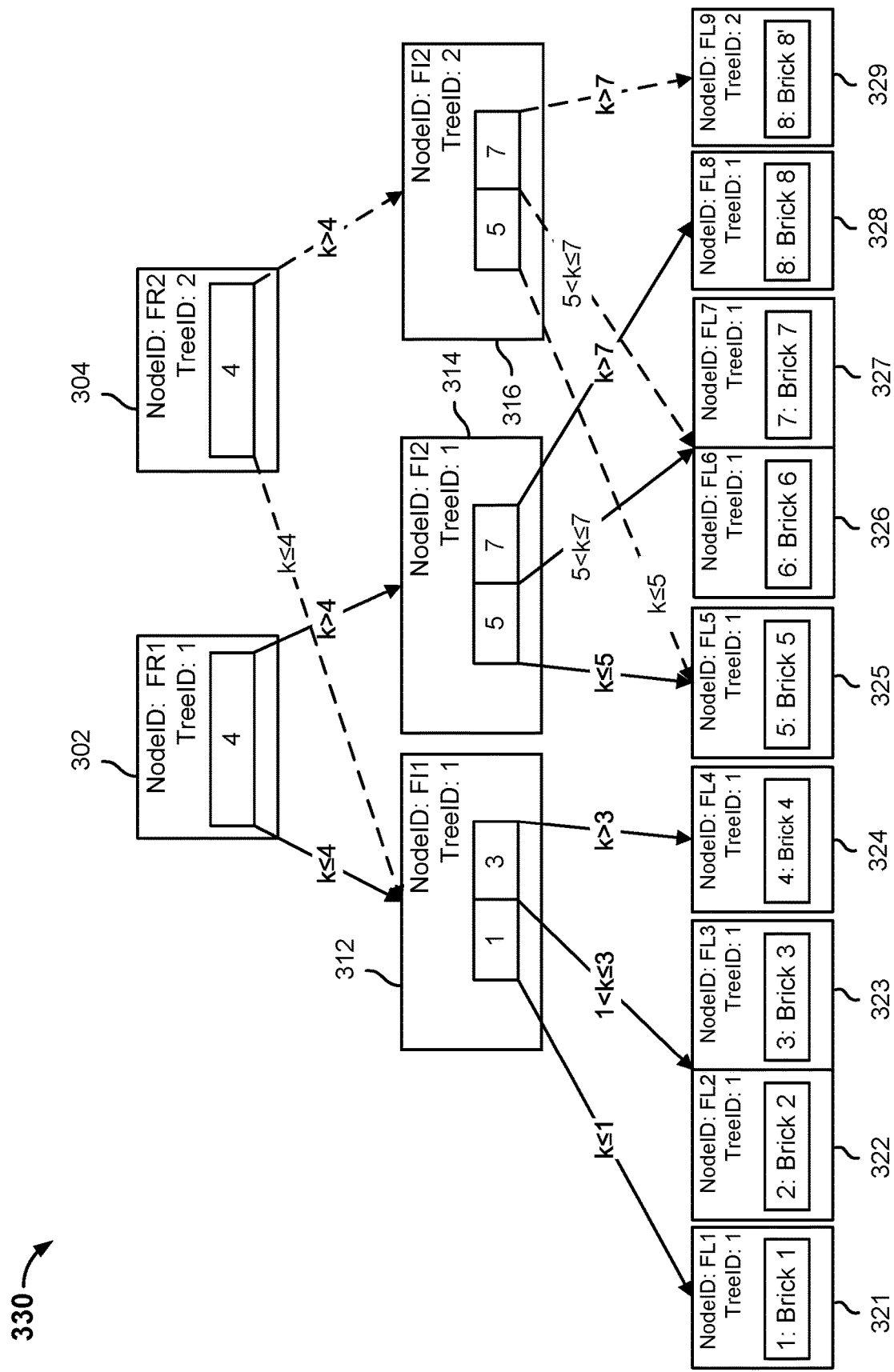
FIG. 3D is a block diagram illustrating an embodiment of a modified file tree.

FIG. 3D is a block diagram illustrating an embodiment of a modified file tree. The tree data structure 320 shown in FIG. 3D illustrates a result of the modifications made to tree data structure 310 as described with respect to FIG. 3C.

Figure 3E:
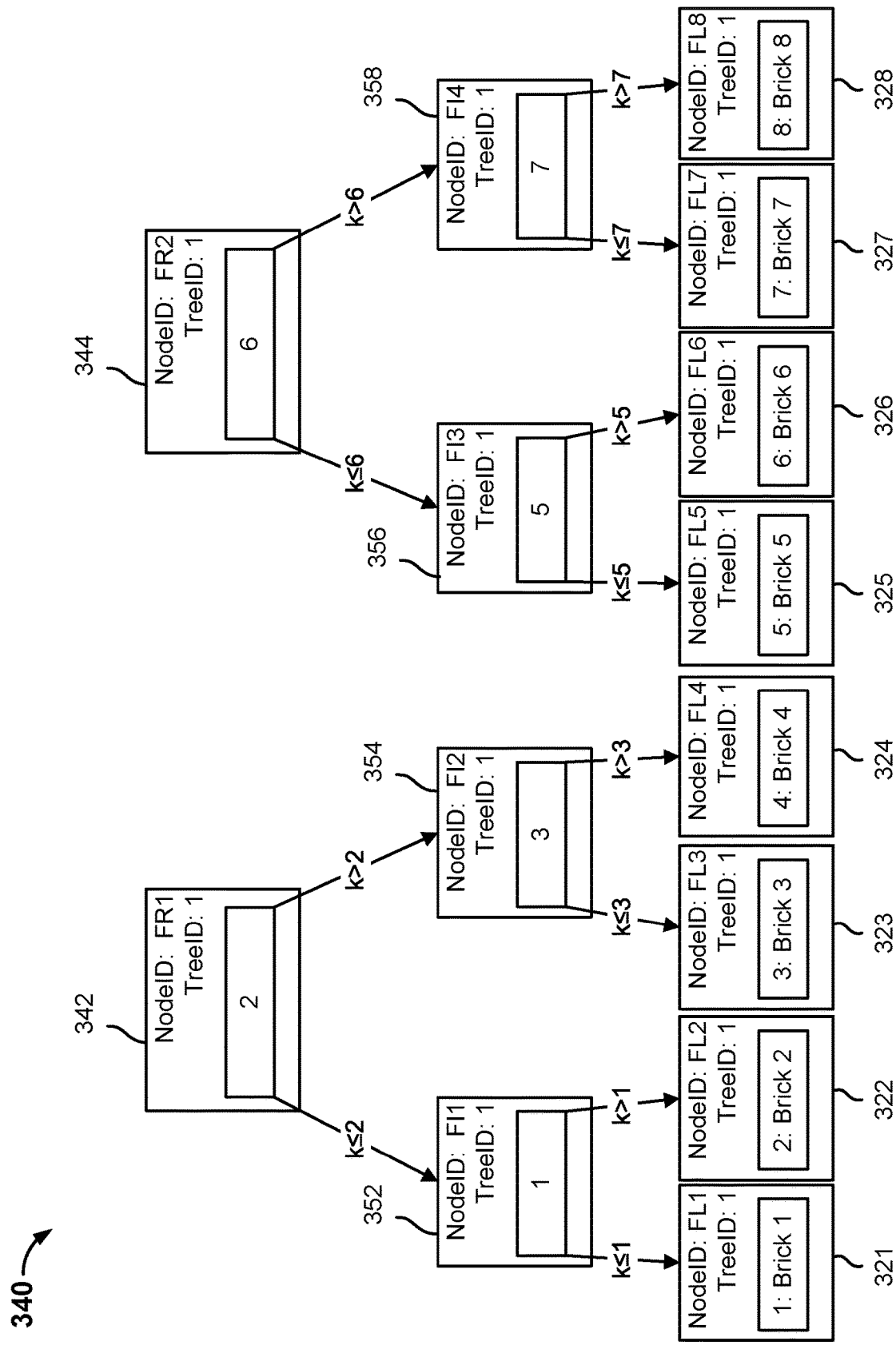
FIG. 3E is a block diagram illustrating an embodiment of split file trees.

FIG. 3E is a block diagram illustrating an embodiment of split file trees. Split file trees 340 may be generated by a file system manager, such as file system manager 115. In the example shown, tree data structure 300 includes a file tree that corresponds to a large content file. The file tree may be split into two or more smaller file trees (e.g., two or more file metadata structures). Split file trees 340 are an example of a file tree corresponding to a large content file being split into two smaller file trees.

In the example shown, the large content file has a file tree corresponding to a first portion of the content file and a file tree corresponding to a second portion of the content file. The file tree corresponding to the first portion of the content file includes root node 342, intermediate nodes 352, 354, and leaf nodes 321, 322, 323, 324. The file tree corresponding to the second portion of the content file includes root node 344, intermediate nodes 356, 358, and leaf nodes 325, 326, 327, 328.

By breaking up a file tree of a large content file into a plurality of smaller file trees, a plurality of modifications to the large content file may be performed in parallel by a plurality of storage nodes instead of in sequence by a single storage node. This reduces the amount of time needed to generate a view of file system data associated with a backup snapshot. A smaller file tree may be modified in a manner as described with respect to FIGS. 3B, 3C, 3D.

The large content file optimization technique reduces the bottleneck associated with updating and/or generating file trees for large content files because the secondary storage system may perform file system operations associated with a content file (e.g., modifications to the file metadata associated with a content file) in parallel instead of sequentially. In the example shown, an update to one of leaf nodes 321, 322, 323, 324 may be made in parallel with an update to one of leaf nodes 325, 326, 327, 328.

In contrast, for the file tree included in FIG. 3A, updates to leaf nodes 321, 322, 323, 324, 325, 326, 327, 328 must be performed in sequence because a write-lock is associated with a leaf node of a snapshot tree that points to root node 302. For FIG. 3E, the updates may be performed in parallel because a write-lock is associated with a leaf node of a snapshot tree that points to root node 342 and a write-lock is associated with a leaf node of the snapshot tree that points to root node 344. Only a single entity may hold a write-lock associated with a leaf node storing a pointer to the file tree corresponding to the content file.

Figure 4A:
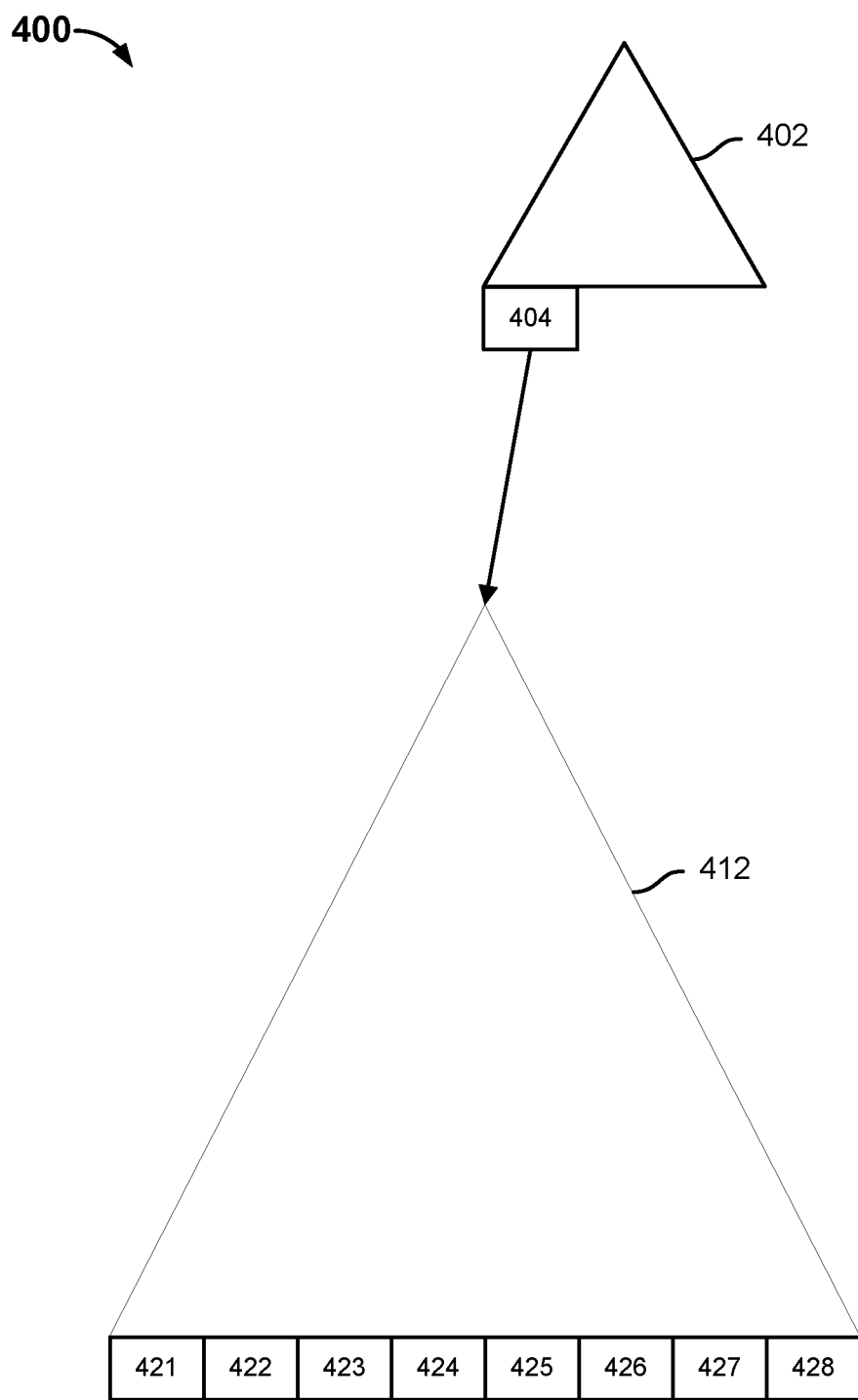
FIG. 4A is a block diagram illustrating an embodiment of a view of file system data.

FIG. 4A is a block diagram illustrating an embodiment of a view of file system data. In the example shown, file system data view 400 may be generated by a file system manager, such as file system manager 115. File system data view 400 may correspond to a backup snapshot of file system data. File system data view 400 includes a snapshot tree 402 and file tree 412. Snapshot tree 402 includes leaf node 404. Snapshot tree 402 may include other leaf nodes that are not shown for explanation purposes.

Leaf node 404 includes a pointer to a root node associated with file tree 412. File tree 412 may correspond to a large content file and stores the file metadata associated with the large content file. The content file associated with file tree 412 includes a plurality of data bricks storing a plurality of data chunks. File tree 412 includes leaf nodes 421, 422, 423, 424, 425, 426, 427, 428. A leaf node may be configured to store a value of a brick that stores one or more data chunks associated with the content file. For example, leaf node 421 is configured to store a value of and/or pointer to a brick (i.e., brick identifier) storing a first subset of data chunks associated with a large content file, leaf node 422 is configured to store a value of and/or pointer to a brick storing a second subset of data chunks associated with the large content file, leaf node 423 is configured to store a value of and/or pointer to a brick storing a third subset of data chunks associated with the large content file, leaf node 424 is configured to store a value of and/or pointer to a brick storing a fourth subset of data chunks associated with the large content file, leaf node 425 is configured to store a value of and/or pointer to a brick storing a fifth subset of data chunks associated with the large content file, leaf node 426 is configured to store a value of and/or pointer to a brick storing a sixth subset of data chunks associated with the large content file, leaf node 427 is configured to store a value of and/or pointer to a brick storing a seventh subset of data chunks associated with the large content file, and leaf node 428 is configured to store a value of and/or pointer to a brick storing an eighth subset of data chunks associated with the large content file.

Figure 4B:
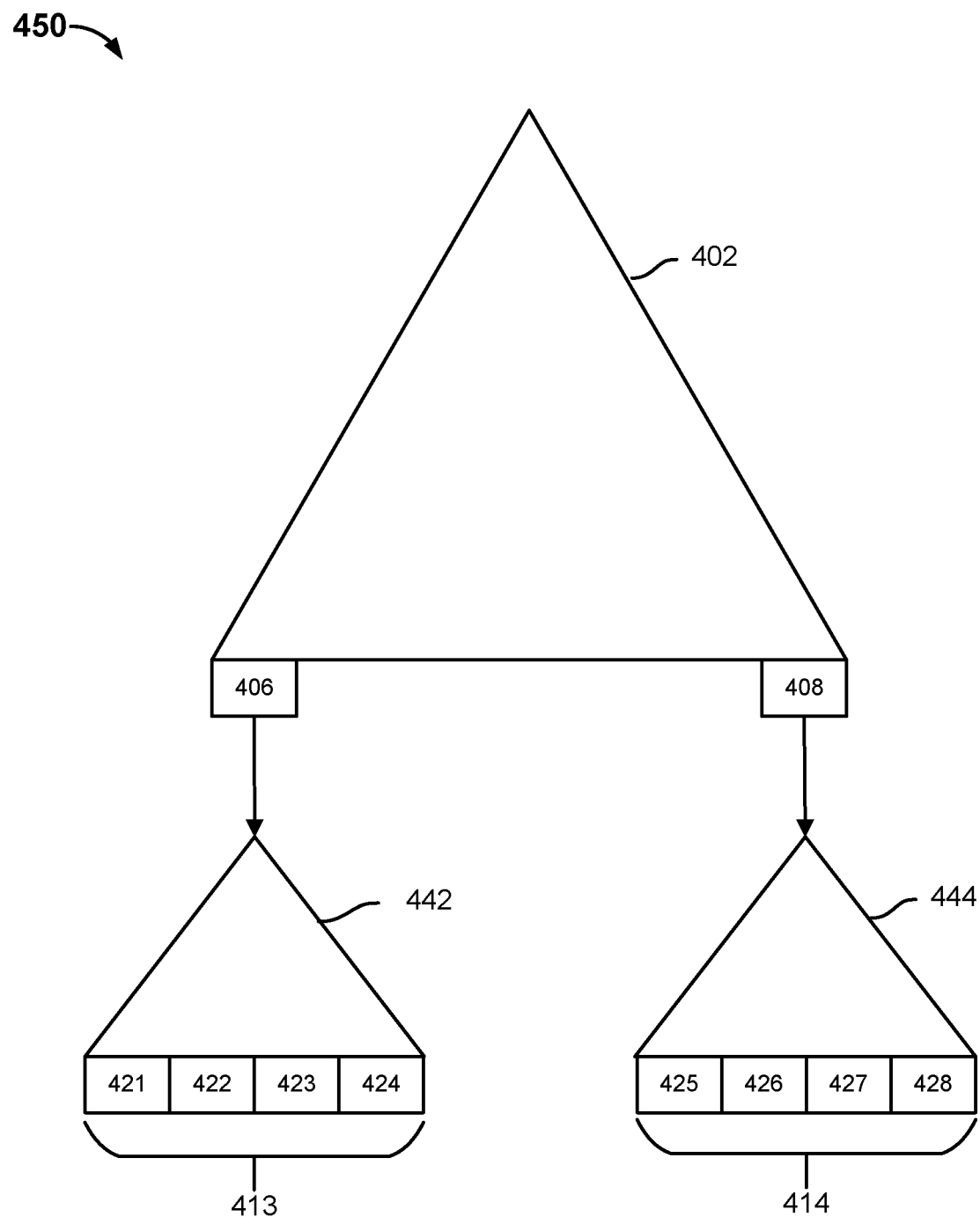
FIG. 4B is a block diagram illustrating an embodiment of a view of file system data.

FIG. 4B is a block diagram illustrating an embodiment of a view of file system data. In the example shown, file system data view 450 may be generated by a file system manager, such as file system manager 115.

File system data view 450 includes a snapshot tree 402 and file trees 442, 444. Snapshot tree 402 includes leaf nodes 406, 408. Snapshot tree 402 may include other leaf nodes that are not shown for explanation purposes.

File tree 412 of FIG. 4A may correspond to a large content file and store the metadata associated with the large content file. A file system manager may split the file tree corresponding to the large content file into a plurality of file trees. In the example shown, file tree 412 has been split into file trees 442, 444. Snapshot tree 402 has been modified such that leaf node 406 includes a pointer to a file tree corresponding to a first portion of the large content file and leaf node 408 includes a pointer to a file tree corresponding to a second portion of the large content file. In some embodiments, snapshot tree 402 is modified such that leaf node 404 includes a pointer to a file tree corresponding to a first portion of the large content file and a pointer to a file tree corresponding to a second portion of the large content file. Although the file tree 412 has been split into two file trees, in other embodiments, file tree 412 may be split into a plurality of file trees (e.g., more than two).

File tree 442 stores a first set of file metadata associated with a large content file. File tree 442 includes a first set of leaf nodes 43 that includes leaf nodes 421, 422, 423, 424. Leaf node 421 is configured to store a value of and/or a pointer to a brick (i.e., brick identifier) storing a first subset of data chunks associated with a large content file, leaf node 422 is configured to store a value of and/or a pointer to a brick storing a second subset of data chunks associated with the large content file, leaf node 423 is configured to store a value of and/or a pointer to a brick storing a third subset of data chunks associated with the large content file, leaf node 424 is configured to store a value of and/or a pointer to a brick storing a fourth subset of data chunks associated with the large content file.

File tree 444 stores a second set of file metadata associated with the large content file. File tree 444 includes a second set of leaf nodes 414 that includes leaf nodes 425, 426, 427, 428. Leaf node 425 is configured to store a value of and/or a pointer to a brick storing a fifth subset of data chunks associated with the large content file, leaf node 426 is configured to store a value of and/or a pointer to a brick storing a sixth subset of data chunks associated with the large content file, leaf node 427 is configured to store a value of and/or a pointer to a brick storing a seventh subset of data chunks associated with the large content file, and leaf node 428 is configured to store a value of and/or a pointer to a brick storing an eighth subset of data chunks associated with the large content file.

By breaking up a file tree of a large content file into a plurality of smaller file trees, a plurality of modifications to the large content file may be performed in parallel by a plurality of storage nodes instead of in sequence by a single storage node. This reduces the amount of time needed to generate a view of file system data associated with a backup snapshot. The large content file optimization technique reduces the bottleneck associated with updating and/or generating file trees for large content files because the secondary storage system may perform file system operations associated with a content file in parallel by a plurality of storage nodes instead of sequentially by a single storage node. In the example shown in FIG. 4B, an update to one of leaf nodes 421, 422, 423, 424 may be made in parallel with an update to one of leaf nodes 425, 426, 427, 428.

In contrast, for the file tree included in FIG. 4A, updates to leaf nodes 421, 422, 423, 424, 425, 426, 427, 428 must be performed in sequence because a write-lock is associated with leaf node 404 that points to a root node of file tree 412. For FIG. 4B the updates may be performed in parallel because a write-lock is associated with leaf node 406 and a write-lock is associated with leaf node 408. Only a single entity may hold a write-lock associated with a leaf node storing a pointer to the file tree corresponding to the content file.

Figure 5A:
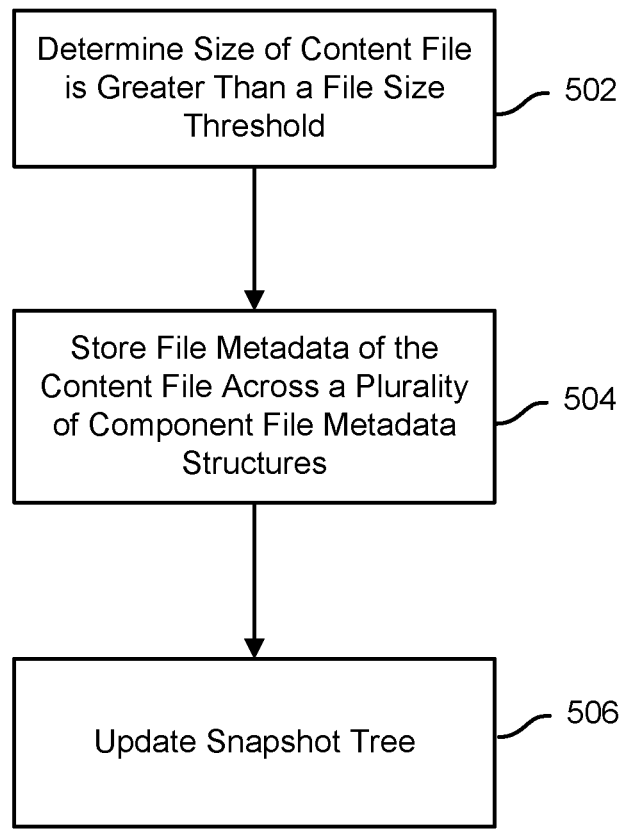
FIG. 5A is a flow chart illustrating an embodiment of a process for generating a view of file system data associated with a backup snapshot.

FIG. 5A is a flow chart illustrating an embodiment of a process for generating a view of file system data associated with a backup snapshot. In the example shown, process 500 may be implemented by a secondary storage system, such as secondary storage system 112.

At 502, it is determined that a size of a content file is greater than a threshold size. A backup snapshot comprising file system data is received. The file system data includes a plurality of content files. At least one of the content files is determined to be a large content file. A large content file is a content file with a size that is greater than a threshold size (e.g., 100 TB). In some embodiments, the size of a content file may be determined based on the data associated with a content file received with the backup snapshot. In other embodiments, a user associated with the backup snapshot indicates that a content file is a large content file.

At 504, the file metadata of the content file is stored across a plurality of component file metadata structures. A plurality of file trees (e.g., file metadata structures) corresponding to the file metadata associated with the content file are generated. The file metadata of the content file specifies tree structure organizing data components of the content file. Each component file metadata structure of the plurality of component file metadata structures stores a portion of the tree structure. Each of the file trees is configured to store a corresponding portion of file metadata associated with the content file. A file system manager may generate a view of the file system data corresponding to the backup snapshot. The view may be comprised of a snapshot tree and a plurality of file trees corresponding to the plurality of content files associated with the file system data. A single file tree for metadata associated with a content file may be generated for content files that are less than or equal to the threshold size. A plurality of file trees for metadata associated with a content file may be generated for a content file that is greater than the threshold size (e.g., a large content file). One of the generated file trees corresponds to a portion of the large content file. A leaf node of generated file tree includes a pointer to a brick storing one or more data chunks associated with the large content file.

In some embodiments, the plurality of file trees corresponding to the large content file correspond to equal portions of the metadata of the large content file. In other embodiments, the plurality of file trees corresponding to the large content file correspond to different portion sizes of the metadata of the large content file.

At 506, a snapshot tree is updated to reference the plurality of file trees associated with the content file. A respective number of leaf nodes corresponding to the number of file trees corresponding to the large content file are generated in a snapshot tree. The file system manager is configured to generate a view of the file system data corresponding to the backup snapshot. The view includes a snapshot tree and a plurality of file trees. The snapshot tree includes a leaf node for each of the plurality of file trees corresponding to the large content file. A leaf node of the snapshot tree associated with one of the file trees corresponding to the large content file includes a pointer to a root node of a file tree corresponding to the large content file. In some embodiments, a leaf node of the snapshot tree includes a plurality of corresponding pointers to the different file trees associated with a large content file.

In some embodiments, a map is updated. The map is configured to match file trees to their corresponding portions of a large content file. The map may include a file offset of a large content file associated with a file tree. For example, the map may indicate that a first file tree is associated with 0-10 MB of the large content file, a second file tree is associated with 10-20 MB of the large content file, etc. The map may also identify brick numbers associated with a file tree. A leaf node of a file tree may be configured to store a brick number associated with a brick storing one or more data chunks of the large content file.

Figure 5B:
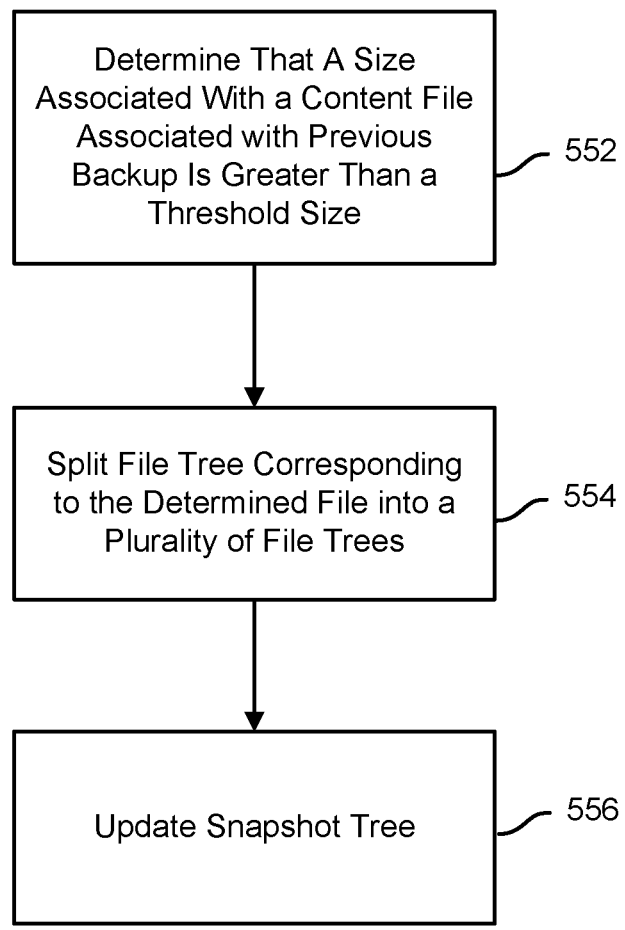
FIG. 5B is a flow chart illustrating an embodiment of a process for generating a view of file system data associated with a backup snapshot.

FIG. 5B is a flow chart illustrating an embodiment of a process for generating a view of file system data associated with a backup snapshot. In the example shown, process 550 may be implemented by a secondary storage system, such as secondary storage system 112.

At 552, it is determined that the size of a content file associated with a previous backup snapshot is greater than a threshold size. A backup snapshot comprising file system data is received. The file system data includes a plurality of content files. At least one of the content files included in the backup snapshot may have been included in a previous backup snapshot. The at least one content file may be determined to be a large content file. The content file included in the previous backup snapshot may have been less than the threshold size at the time when the previous backup snapshot was performed, but has been modified such that the size of the content file included in the backup snapshot is greater than the threshold size, i.e., the content file was not previously a large content file, but is now a large content file.

At 554, the file metadata of the content file is stored across a plurality of component file metadata structures. One or more file trees (e.g., file metadata structures) corresponding to the file metadata associated with the content file are generated. The file metadata of the content file specifies tree structure organizing data components of the content file. Each component file metadata structure of the plurality of component file metadata structures stores a portion of the tree structure. Each of the file trees is configured to store a corresponding portion of file metadata associated with the content file. A leaf node of generated file tree includes a pointer to a brick storing one or more data chunks associated with the large content file.

In some embodiments, the file system manager is configured to generate one or more file trees corresponding to the portion of the file metadata associated with the large content file that was included in the backup snapshot. For example, a file tree corresponding to the previously stored portion of the file metadata associated with the large content file is already stored and one or more file trees corresponding to the new portion of the file metadata associated with the large content file are generated.

In other embodiments, the file system manager is configured to generate a plurality of files trees corresponding to the previously stored portions and new portions of the large content file. For example, a file tree corresponding to the previously stored portion of the file metadata associated with a large content file is already stored. A plurality of file trees corresponding to the previously stored portions of the file metadata associated with the large content file and the new portions of file metadata associated with the large content file may be generated. The plurality of file trees are associated with the received backup snapshot because they may include an identifier associated with the received backup snapshot.

In some embodiments, the plurality of file trees corresponding to the large content file correspond to equal portions of file metadata associated with the large content file. In other embodiments, the plurality of file trees corresponding to the large content file correspond to different portion sizes of the file metadata associated with the large content file.

At 556, a snapshot tree is updated to reference the plurality of file trees associated with the content file. The file system manager is configured to generate a view of the file system data corresponding to the backup snapshot. The view includes a snapshot tree and a plurality of file trees. The snapshot tree includes a leaf node for each of the plurality of file trees corresponding to the large content file. A leaf node associated with one of the file trees corresponding to the large content file includes a pointer to a root node of a file tree corresponding to the large content file.

In some embodiments, a map exists that associates a file offset range of the content file with a particular file tree. When a read or write request is received, the request is redirected to the correct file tree based on the map. For example, a request for data included in one of the leaf nodes included in the set of leaf nodes 413 may be received. The set of leaf nodes 413 are associated with a particular file offset range of the content file. The map may be examined to determine which file tree corresponds to the requested file offset range. In some embodiments, the map may be used to direct a request to file tree 442. In other embodiments, the map may be used to direct a request to file tree 444.

In some embodiments, the snapshot tree includes a leaf node with a pointer to a file tree corresponding to the portion of the large content file previously stored (e.g., a file tree associated with a previously stored backup snapshot) and one or more leaf nodes with corresponding pointers to portions of the large content file included in the backup snapshot.

In other embodiments, the snapshot tree includes a plurality of leaf nodes with corresponding pointers to file trees associated with the large content file. A plurality of file trees corresponding to the previously stored portions of the large content file and the new portions of the large content file may be generated.

In some embodiments, a map is updated. The map is configured to match file trees to their corresponding portions of a large content file. The map may include a file offset of a large content file associated with a file tree. For example, the map may indicate that a first file tree is associated with 0-10 MB of the large content file, a second file tree is associated with 10-20 MB of the large content file, etc. The map may also identify brick numbers associated with a file tree. A leaf node of a file tree may be configured to store a brick number associated with a brick storing one or more data chunks of the large content file.

Figure 5C:
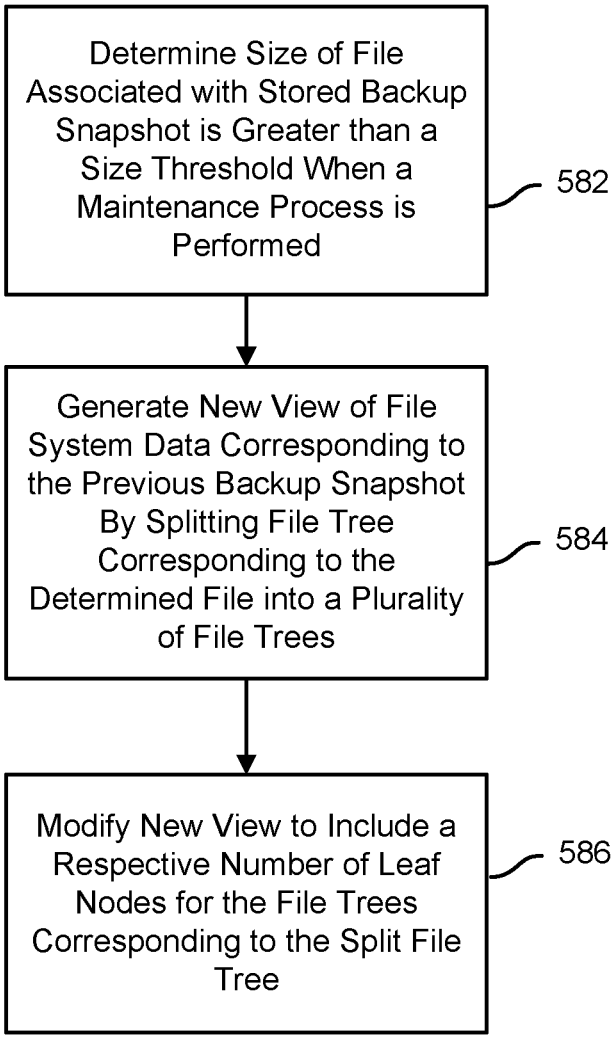
FIG. 5C is a flow chart illustrating an embodiment of a process for generating a view of file system data associated with a backup snapshot.

FIG. 5C is a flow chart illustrating an embodiment of a process for generating a view of file system data associated with a backup snapshot. In the example shown, process 580 may be implemented by a secondary storage system, such as secondary storage system 112.

At 582, it is determined that the size of a content file associated with a stored backup snapshot is greater than a threshold size when a maintenance process is performed. A maintenance process may be scheduled to determine one or more large content files associated with a stored backup snapshot. The one or more large content files may be determined by traversing a snapshot tree associated with a stored backup snapshot. A leaf node of a snapshot tree may store data indicating a size of a content file. One or more file trees associated with the stored backup snapshot and corresponding to large content files are identified.

At 584, a new view of the file system data corresponding to the stored backup snapshot is generated by splitting the file tree corresponding to the determined content file into a plurality of file trees (e.g., plurality of file metadata structures). For example, the file tree depicted in FIG. 3A has been split into two smaller file trees as depicted in FIG. 3E. Each of the file trees is configured to store a corresponding portion of file metadata associated with the content file. A view of the file system data may be generated such that the file trees corresponding to the large content files are divided into a plurality of smaller file trees. This may performed as a proactive measure to reduce the amount of time needed to perform future file system operations associated with the large content files. For example, a previous backup snapshot may include a large content file. A view corresponding to the previous backup snapshot may include a single file tree for the large content file. A future backup snapshot may include a plurality of modifications to the large content file. Because only a single entity may hold a write-lock associated with the leaf node storing a pointer to the file tree corresponding to the large content file, the plurality of modifications to the file metadata associated with the large content file must be performed in a sequential manner By proactively splitting the file tree corresponding to a large content file into a plurality of smaller file trees, the amount of time needed to perform the future modifications to the large content file is reduced because a plurality of storage nodes may perform the modifications in parallel instead of a single storage node sequentially performing the modifications.

At 586, the new view is modified to include a respective number of leaf nodes for the file trees corresponding to the split file tree. The view includes a snapshot tree and a plurality of file trees. The snapshot tree includes a leaf node for each of the plurality of file trees corresponding to the split large content file. A leaf node associated with one of the file trees corresponding to the split large content file includes a pointer to a root node of a file tree corresponding to the large content file.

In some embodiments, a map is updated. The map is configured to match file trees to their corresponding portions of a large content file. The map may include a file offset of a large content file associated with a file tree. For example, the map may indicate that a first file tree is associated with 0-10 MB of the large content file, a second file tree is associated with 10-20 MB of the large content file, etc. The map may also identify brick numbers associated with a file tree. A leaf node of a file tree may be configured to store a brick number associated with a brick storing one or more data chunks of the large content file.

Figure 6:
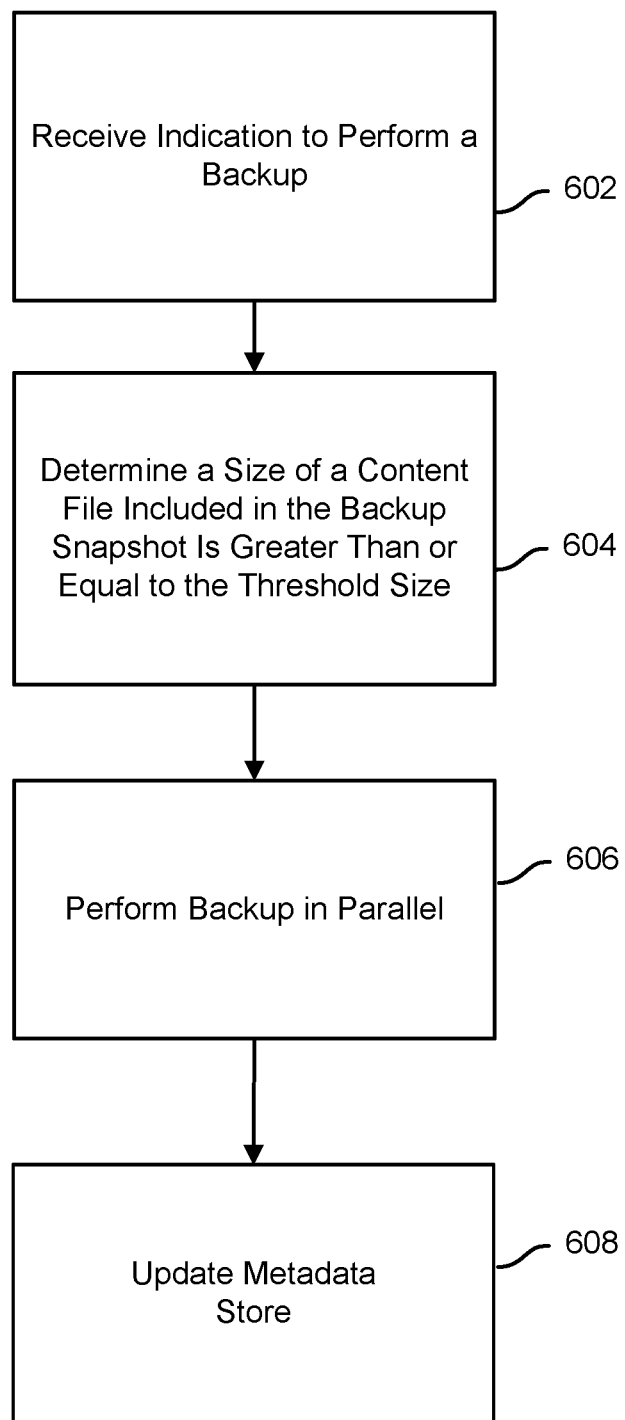
FIG. 6 is a flow chart illustrating an embodiment of a process for performing a backup.

FIG. 6 is a flow chart illustrating an embodiment of a process for performing a backup. In the example shown, process 600 may be implemented by a secondary storage system, such as secondary storage system 112.

At 602, an indication to perform a backup is received. A primary system is configured to store file system data that is comprised of a plurality of content files and associated metadata. The primary system may provide the indication to the secondary storage system. A secondary storage system may be comprised of a plurality of storage nodes. A secondary storage system may receive and store the backup snapshot across the plurality of storage nodes.

At 604, it is determined that a size of a content file included in the backup snapshot is greater than or equal to the threshold size. A backup snapshot comprising file system data is received. The file system data includes a plurality of content files. At least one of the content files is determined to be a large content file. A large content file is a content file with a size that is greater than a threshold size (e.g., 100 TB). In some embodiments, the size of a content file may be determined based on the data associated with a content file received with the backup snapshot. In other embodiments, a user associated with the backup snapshot indicates that a content file is a large content file.

At 606, the backup of the backup snapshot is performed in parallel. The secondary storage system is comprised of a plurality of storage nodes. The plurality of storage nodes may perform the backup in parallel. The backup of the determined content file may also be performed in parallel by the plurality of storage nodes because it is determined to be a large content file. The file system manager is configured to generate a plurality of file trees for the large content file. One of the generated file trees corresponds to a portion of the large content file. Each file tree is configured to store a corresponding portion of the file metadata associated with the large content file. A leaf node of generated file tree includes a pointer to a brick storing one or more data chunks associated with the large content file. The file system manager may generate a corresponding snapshot tree leaf node for the plurality of file trees corresponding to the large content file. A corresponding snapshot tree leaf node includes a pointer to a file tree corresponding to a portion of the large content file. A storage node may be required to hold a write-lock associated with the leaf node of a snapshot tree storing a pointer to the file tree corresponding to the content file, i.e., a pointer to a file metadata structure associated with the content file. Only a single node may hold a write-lock associated with the leaf node of a snapshot tree storing a pointer to the file tree corresponding to the content file. But, because there are multiple leaf nodes in the snapshot tree with pointers to file trees corresponding to different portions of the large content file, the file metadata associated with the large content file may be written in parallel by a plurality of storage nodes.

At 608, a metadata store is updated. The metadata store is updated to include a map that is configured to match file trees to their corresponding portions of a large content file. The map may include a file offset of a large content file associated with a file tree. For example, the map may indicate that a first file tree is associated with 0-10 MB of the large content file, a second file tree is associated with 10-20 MB of the large content file, etc. The map may also identify brick numbers associated with a file tree. A leaf node of a file tree may be configured to store a brick number associated with a brick storing one or more data chunks of the large content file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   determine that a size associated with a content file is greater than a threshold size, wherein a storage system is configured to generate one or more component file metadata structures for the content file, wherein metadata associated with the content file is stored in a first component file metadata structure, wherein the content file is stored by the storage system;
   in response to the determination that the size associated with the content file is greater than the threshold size:
   generate one or more additional component file metadata structures for the content file;
   store file metadata of the content file split across a plurality of component file metadata structures, wherein the plurality of component file metadata structures are associated with different portions of the content file, wherein the first component file metadata structure is configured to store file metadata corresponding to the content file prior to the split and the one or more additional component file metadata structures are configured to store file metadata corresponding to the content file after the split, wherein a component file metadata structure of the content file specifies a tree structure organizing data components of the content file and each component file metadata structure of the plurality of component file metadata structures is configured to store a portion of the file metadata of content file, wherein each component file metadata structure includes a corresponding root node, a corresponding plurality of intermediate nodes, and a corresponding plurality of leaf nodes; and
update a snapshot tree to reference the plurality of component file metadata structures for the content file, wherein the snapshot tree is configured to store file system metadata associated with a primary system, wherein the snapshot tree includes a first root node, a first plurality of intermediate nodes, and a first plurality of leaf nodes, wherein a first leaf node of the first plurality of leaf nodes includes a first reference to a first root node associated with the first component file metadata structure of the component file metadata structures and a second leaf node of the first plurality of leaf nodes includes a second reference to a second root node associated with a second component file metadata structure of the component file metadata structures; and
a memory coupled to the processor and configured to provide the processor with instructions.

2. The system of claim 1, wherein to update the snapshot tree to reference the plurality of component file metadata structures, the processor is further configured to update the first plurality of leaf nodes of the snapshot tree with corresponding pointers to the plurality of component file metadata structures.

3. The system of claim 1, wherein a leaf node of the corresponding plurality of leaf nodes includes a pointer to a brick associated with one or more data chunks of the content file.

4. The system of claim 1, wherein a leaf node of the corresponding plurality of leaf nodes includes an identifier of a brick associated with one or more data chunks of the content file.

5. The system of claim 1, wherein the processor is configured to receive a backup snapshot that includes at least a portion of the content file.

6. The system of claim 5, wherein the processor is configured to determine that the size associated with the content file is greater than the threshold size based on a user input.

7. The system of claim 5, wherein the processor is configured to determine that the size associated with the content file is greater than the threshold size based on the plurality of data chunks of the content file included in the received backup snapshot.

8. The system of claim 5, wherein the received backup snapshot includes a first portion of the content file and a previously stored backup snapshot includes a second portion of the content file.

9. The system of claim 8, wherein the size associated with the content file included in the second portion is less than the threshold size, and wherein the size associated with the content file included in a combination of the first portion and the second portion is greater than the threshold size.

10. The system of claim 1, wherein the processor is further configured to:
perform a maintenance process; and
determine that the content file is greater than the threshold size based in part on the maintenance process.

11. The system of claim 10, wherein the processor is further configured to generate a new view of file system data that includes the content file, wherein the new view includes the plurality of component file metadata structures.

12. The system of claim 1, wherein a plurality of storage nodes, in parallel, are configured to store the file metadata of the content file split across the plurality of component file metadata structures.

13. A method, comprising:
determining that a size associated with a content file is greater than a threshold size, wherein a storage system is configured to generate one or more component file metadata structures for the content file, wherein metadata associated with the content file is stored in a first component file metadata structure, wherein the content file is stored by the storage system;
in response to the determining that the size associated with the content file is greater than the threshold size:
generating one or more additional component file metadata structures for the content file;
storing file metadata of the content file split across a plurality of component file metadata structures, wherein the plurality of component file metadata structures are associated with different portions of the content file, wherein the first component file metadata structure is configured to store metadata corresponding to the content file prior to the split and the one or more additional component file metadata structures are configured to store metadata corresponding to the content file after the split, wherein a component file metadata structure of the content file specifies a tree structure organizing data components of the content file and each component file metadata structure of the plurality of component file metadata structures is configured to store a portion of the file metadata of the content file, wherein each component file metadata structure includes a corresponding root node, a corresponding plurality of intermediate nodes, and a corresponding plurality of leaf nodes; and
updating a snapshot tree to reference the plurality of component file metadata structures for the content file, wherein the snapshot tree is configured to store file system metadata associated with a primary system, wherein the snapshot tree includes a first root node, a first plurality of intermediate nodes, and a first plurality of leaf nodes, wherein a first leaf node of the first plurality of leaf nodes includes a first reference to a first root node associated with the first component file metadata structure of the component file metadata structures and a second leaf node of the first plurality of leaf nodes includes a second reference to a second root node associated with a second component file metadata structure of the component file metadata structures.

14. The method of claim 13, further comprising receiving a backup snapshot that includes at least a portion of the content file.

15. The method of claim 14, wherein the size associated with the content file is determined to be greater than the threshold size based on a user input.

16. The method of claim 14, wherein the size associated with the content file is determined to be greater than the threshold size based on the plurality of data chunks of the content file included in the received backup snapshot.

17. The method of claim 14, wherein the received backup snapshot includes a first portion of the content file and a previously stored backup snapshot includes a second portion of the content file.

18. The method of claim 14, further comprising:
performing a maintenance process; and
determining that the content file is greater than the threshold size based in part on the maintenance process.

19. A computer program product, the computer program product being embodied in a non-transitory computer readable storage medium and comprising computer instructions for:
- determining that a size associated with a content file is greater than a threshold size, wherein a storage system is configured to generate one or more component file metadata structures for the content file, wherein metadata associated with the content file is stored in a first component file metadata structure, wherein the content file is stored by the storage system;
- in response to the determination that the size associated with the content file is greater than the threshold size:
  - generate one or more additional component file metadata structures for the content file;
  - storing file metadata of the content file split across a plurality of component file metadata structures, wherein the plurality of component file metadata structures are associated with different portions of the content file, wherein the first component file metadata structure is configured to store metadata corresponding to the content file prior to the split and the one or more additional component file metadata structures are configured to store metadata corresponding to the content file after the split, wherein a component file metadata structure of the content file specifies tree structure organizing data components of the content file and each component file metadata structure of the plurality of component file metadata structures is configured to store a portion of the file metadata of the content file, wherein each component file metadata structure includes a corresponding root node, a corresponding plurality of intermediate nodes, and a corresponding plurality of leaf nodes; and
- updating a snapshot tree to reference the plurality of component file metadata structures for the content file, wherein the snapshot tree is configured to store file system metadata associated with a primary system, wherein the snapshot tree includes a first root node, a first plurality of intermediate nodes, and a first plurality of leaf nodes, wherein a first leaf node of the first plurality of leaf nodes includes a first reference to a first root node associated with the first component file metadata structure of the component file metadata structures and a second leaf node of the first plurality of leaf nodes includes a second reference to a second root node associated with a second component file metadata structure of the component file metadata structures.

* * * * *

UNITED STATES PATENT AND TRADEMARK OFFICE
CERTIFICATE OF CORRECTION

PATENT NO. : 10,664,461 B2
APPLICATION NO. : 16/024107
DATED : May 26, 2020
INVENTOR(S) : Zhihuan Qiu and Ganesha Shanmuganathan Page 1 of 1

It is certified that error appears in the above-identified patent and that said Letters Patent is hereby corrected as shown below:

In the Claims

In Column 28, Line(s) 65-66, Claim 1, insert --the-- in between "of" and "content.".
In Column 29, Line(s) 43-44, Claim 7, delete "the plurality" and insert --a plurality--, therefor.
In Column 30, Line(s) 57-58, Claim 16, delete "the plurality" and insert --a plurality--, therefor.

Signed and Sealed this
First Day of December, 2020

Andrei Iancu
*Director of the United States Patent and Trademark Office*